United States Patent
Sartori et al.

(10) Patent No.: US 10,638,464 B2
(45) Date of Patent: Apr. 28, 2020

(54) SYSTEM AND METHOD FOR TRANSMISSION AND RECEPTION OF CONTROL CHANNELS IN A COMMUNICATIONS SYSTEM

(75) Inventors: Philippe Sartori, Algonquin, IL (US); Bingyu Qu, Schaumburg, IL (US); Weimin Xiao, Rolling Meadows, IL (US); Brian Classon, Palatine, IL (US); Vipul Desai, Palatine, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 710 days.

(21) Appl. No.: 13/434,449

(22) Filed: Mar. 29, 2012

(65) Prior Publication Data

US 2012/0250551 A1    Oct. 4, 2012

Related U.S. Application Data

(60) Provisional application No. 61/470,940, filed on Apr. 1, 2011, provisional application No. 61/471,049, filed on Apr. 1, 2011, provisional application No. 61/471,055, filed on Apr. 1, 2011, provisional application No. 61/471,061, filed on Apr. 1, 2011.

(51) Int. Cl.
*H04W 72/04* (2009.01)
*H04W 24/10* (2009.01)
*H04W 48/12* (2009.01)

(52) U.S. Cl.
CPC ......... *H04W 72/042* (2013.01); *H04W 24/10* (2013.01); *H04W 48/12* (2013.01); *H04W 72/0406* (2013.01)

(58) Field of Classification Search
None
See application file for complete search history.

(56) References Cited

U.S. PATENT DOCUMENTS 8,204,512 B2 * 6/2012 Dietrich et al. ........... 455/456.2
8,433,251 B2 * 4/2013 Chen et al. ................ 455/68
(Continued)

FOREIGN PATENT DOCUMENTS

CN    101589582 A    11/2009
CN    101626625 A    1/2010
(Continued)

OTHER PUBLICATIONS

"3rd Generation Partnership Project; Technical Specification Group Radio Access Network; Evolved Universal Terrestrial Radio Access (E-UTRA); Physical layer for relaying operation (Release 10)," 3GPP TS 36.216, V10.1.0, Dec. 2010, 15 pages.
(Continued)

Primary Examiner — Hicham B Foud
(74) Attorney, Agent, or Firm — Slater Matsil, LLP

(57) ABSTRACT

A method for transmitting control information to a wireless node. A communications controller determines a region for the control information in a subframe as at least one of a data region and a control region of the subframe. The communications controller modulates the control information, and maps the modulated control information onto resources of the subframe according to the determined region. The communications controller transmits the subframe to the wireless node.

28 Claims, 20 Drawing Sheets

(56) References Cited

U.S. PATENT DOCUMENTS

| | | | |
|---|---|---|---|
| 8,441,996 B2* | 5/2013 | Kim et al. | 370/329 |
| 8,538,411 B2* | 9/2013 | Kwon et al. | 455/422.1 |
| 9,338,730 B2 | 5/2016 | Sartori et al. | |
| 2008/0032632 A1 | 2/2008 | Choi et al. | |
| 2008/0043678 A1 | 2/2008 | Taniguchi | |
| 2008/0239977 A1* | 10/2008 | Xue et al. | 370/252 |
| 2009/0003274 A1* | 1/2009 | Kwak et al. | 370/329 |
| 2009/0088148 A1 | 4/2009 | Chung et al. | |
| 2009/0161618 A1* | 6/2009 | Johansson et al. | 370/329 |
| 2009/0257449 A1 | 10/2009 | Chen et al. | |
| 2010/0103901 A1* | 4/2010 | Miki et al. | 370/330 |
| 2010/0111226 A1 | 5/2010 | Ko et al. | |
| 2010/0135273 A1* | 6/2010 | Kim | 370/344 |
| 2010/0150206 A1 | 6/2010 | Futagi et al. | |
| 2010/0165847 A1 | 7/2010 | Kamuf et al. | |
| 2010/0172314 A1 | 7/2010 | Lim et al. | |
| 2010/0177835 A1 | 7/2010 | Dounaev et al. | |
| 2010/0215011 A1 | 8/2010 | Pan et al. | |
| 2010/0246518 A1 | 9/2010 | Gheorghiu et al. | |
| 2010/0254268 A1 | 10/2010 | Kim et al. | |
| 2010/0272201 A1 | 10/2010 | Nakao et al. | |
| 2010/0302983 A1 | 12/2010 | McBeath et al. | |
| 2010/0303011 A1 | 12/2010 | Pan et al. | |
| 2010/0317359 A1 | 12/2010 | Suga | |
| 2010/0322135 A1* | 12/2010 | Van Lieshout et al. | 370/312 |
| 2010/0322154 A1* | 12/2010 | Chen et al. | 370/328 |
| 2011/0021228 A1* | 1/2011 | Kim et al. | 455/507 |
| 2011/0044391 A1* | 2/2011 | Ji et al. | 375/260 |
| 2011/0085506 A1 | 4/2011 | Lee et al. | |
| 2011/0103295 A1 | 5/2011 | Khandekar et al. | |
| 2011/0116572 A1 | 5/2011 | Lee et al. | |
| 2011/0142000 A1* | 6/2011 | Han et al. | 370/329 |
| 2011/0142107 A1 | 6/2011 | Pan et al. | |
| 2011/0158104 A1 | 6/2011 | Frenger et al. | |
| 2011/0243090 A1 | 10/2011 | Grovlen et al. | |
| 2011/0273096 A1* | 11/2011 | Kim et al. | 370/242 |
| 2011/0299490 A1 | 12/2011 | Nordstrom et al. | |
| 2011/0317615 A1* | 12/2011 | Soong | H04W 72/042 370/315 |
| 2012/0008586 A1 | 1/2012 | Kwon et al. | |
| 2012/0045014 A1* | 2/2012 | Damnjanovic | H04L 5/001 375/295 |
| 2012/0051319 A1* | 3/2012 | Kwon | H04W 72/0406 370/329 |
| 2012/0063401 A1 | 3/2012 | Xue et al. | |
| 2012/0069793 A1* | 3/2012 | Chung et al. | 370/315 |
| 2012/0082130 A1 | 4/2012 | Xue et al. | |
| 2012/0113889 A1* | 5/2012 | Noh | H04B 7/155 370/315 |
| 2012/0207099 A1 | 8/2012 | Lindh et al. | |
| 2012/0207126 A1* | 8/2012 | Qu | H04L 5/005 370/330 |
| 2012/0275414 A1 | 11/2012 | Hu et al. | |
| 2012/0314667 A1* | 12/2012 | Taoka | H04B 7/0452 370/329 |
| 2013/0003647 A1* | 1/2013 | Shen | H04L 5/0091 370/315 |
| 2014/0192134 A1 | 7/2014 | Jung et al. | |

FOREIGN PATENT DOCUMENTS

| | | |
|---|---|---|
| CN | 101682406 A | 3/2010 |
| CN | 101682419 A | 3/2010 |
| CN | 101868003 A | 10/2010 |
| CN | 101868033 A | 10/2010 |
| CN | 101932077 A | 10/2010 |
| CN | 101908955 A | 12/2010 |
| EP | 1681790 B1 | 5/2007 |
| EP | 2448146 A2 | 5/2012 |
| RU | 2391799 C2 | 6/2010 |
| WO | WO 2009/041779 A1 | 4/2009 |
| WO | 2010058245 A1 | 5/2010 |
| WO | WO 2010/070197 A1 | 6/2010 |
| WO | WO 2010/082877 A1 | 7/2010 |
| WO | 2010117225 A2 | 10/2010 |
| WO | 2010129605 A1 | 11/2010 |
| WO | 2010140748 A1 | 12/2010 |
| WO | 2010151086 A2 | 12/2010 |
| WO | WO 2010/145530 A1 | 12/2010 |
| WO | WO 2010/145532 A1 | 12/2010 |

OTHER PUBLICATIONS

"3$^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.1.0, Mar. 2011, 103 pages.

"3$^{rd}$ Generation Partnership Project; Technical Specification Group Radio Access Network; Evolved Universal Terrestrial Radio Access (E-UTRA); Multiplexing and channel coding (Release 10)," 3GPP TS 36.212, V10.3.0, Sep. 2011, 79 pages.

"3$^{rd}$ Generation Partnership Project; Technical Specification Group Radio Access Network; Evolved Universal Terrestrial Radio Access (E-UTRA); Physical layer procedures (Release 10)," 3GPP TS 36.213, V10.3.0, Sep. 2011, 122 pages.

"3$^{rd}$ Generation Partnership Project; Technical Specification Group Radio Access Network; Evolved Universal Terrestrial Radio Access (E-UTRA); Physical layer for relaying operation (Release 10)," 3GPP TS 36.216, V10.3.1, Sep. 2011, 16 pages.

Extended European Search Report, Application No. 12763491.3, dated Apr. 1, 2014, 10 pages.

Asustek, "PHICH resource allocation in LTE-A," 3GPP TSG RAN WG1 Meeting #60, Decision and Discussion, San Francisco, CA, USA, Feb. 22-26, 2010, 4 pages.

International Search Report received in Patent Cooperation Treaty Application No. PCT/CN2012/073473, dated Jul. 12, 2012, 3 pages.

Written Opinion of the International Searching Authority received in Patent Cooperation Treaty Application No. PCT/CN2012/073473, dated Jul. 12, 2012, 4 pages.

U.S. Office Action of U.S. Appl. No. 13/436,657, dated Dec. 26, 2013, 21 pages.

EP Office Action received in Application No. 12763491.3-1854 dated Feb. 5, 2015, 8 pages.

Panasonic, "Capturing of agreements on relaying from RAN1 #64," Change Request received in 3GPP TSG-RAN1 Meeting #64, R1-111217, Taipei, Taiwan, Feb. 21-25, 2011, 12 pages.

Communication pursuant to Article 94(3) EPC received in Application No. 12763491.3-1854 dated Jul. 21, 2015, 7 pages.

Russian Notice of Allowance received in Application No. 2013148797 dated Sep. 1, 2015, 12 pages.

3rd Generation Partnership Project; Technical Specification Group Radio Access Network; Evolved Universal Terrestrial Radio Access (E-UTRA); Physical layer procedures(Release 10), 3GPP TS 36.213 V10.1.0 (Mar. 2011), 115 pages.

3rd Generation Partnership Project; Technical Specification Group Radio Access Network; Evolved Universal Terrestrial Radio Access (E-UTRA); Radio Resource Control (RRC); Protocol specification(Release 9), 3GPP TS 36.331 V9.6.0 (Mar. 2011), 252 pages.

* cited by examiner

SYSTEM AND METHOD FOR TRANSMISSION AND RECEPTION OF CONTROL CHANNELS IN A COMMUNICATIONS SYSTEM

This application claims the benefit of U.S. Provisional Application Nos. 61/470,940, filed on Apr. 1, 2011, entitled "System and Method for Transmission and Reception of Control Channels in a Communications System," No. 61/471,049, filed on Apr. 1, 2011, entitled "System and Method for Signaling a Location of a Control Channel," No. 61/471,055, filed on Apr. 1, 2011, entitled "System and Method for Transmission and Reception of Control Channels," and No. 61/471,061, filed on Apr. 1, 2011, entitled "System and Method for Transmission and Reception of Control Channels," which applications are hereby incorporated herein by reference.

CROSS-REFERENCE TO RELATED APPLICATIONS

This application is related to the following co-assigned patent applications: Ser. No. 13/436,375, filed Mar. 30, 2012, entitled "System and Method for Signaling a Location of a Control Channel"; Ser. No. 13/436,590, filed Mar. 30, 2012, entitled "System and Method for Transmitting and Receiving Control Channels"; and Ser. No. 13/436,657, filed Mar. 30, 2012, entitled "System and Method for Transmission and Reception of Control Channels" which applications are hereby incorporated herein by reference.

TECHNICAL FIELD

The present disclosure relates generally to digital communications, and more particularly to a system and method for transmission and reception of control channels in a communications system.

BACKGROUND

Wireless telephony systems have traditionally been deployed using the concept of a cell, with one base station (BS) (also known as base transceiver station (BTS), Node B (NB), evolved NB (eNB), Access Point, communications controller, and the like) covering a given geographic area. BSs having the same or similar transmit power are typically used. In addition, in order to maximize coverage and to maintain interference at a reasonable level, careful site planning is used. A network deployed in such a manner is usually referred to as a homogenous network (HomoNet).

While such a deployment is optimal when the user density is uniform, in practice, it has serious shortcomings because the user density and traffic demand are rarely uniform. For example, in rural areas, roads are typically the only area where users are present. In urban or suburban areas, there are locations (hot spots) where the traffic demand is higher: such locations may comprise shopping malls, hotels, conference centers, and the like.

In order to improve coverage and user satisfaction, it may be advantageous to cover these hot spots of traffic demands with Low Power Nodes (LPNs). For instance, lower power base stations can be deployed to, e.g., cover lobbies of hotels, portions of shopping malls, and the like. The coverage of such a base station is referred to as a pico cell. When the base station transmit power is even lower, e.g., to cover a single residential unit, the coverage of such a base station is referred to as a femto cell. A network comprising regular base stations and pico cells and/or femto cells is referred to as a heterogeneous network (HetNet).

HetNets present new challenges to the deployment of a cellular system. In particular, the cellular layout may not be as regular as for a HomoNet since it is dependent on the hot spot locations. In particular, it may well happen that a LPN is located close to another base station. The close proximity can create a high level of interference for both user equipment (UE) (also known as mobile station (MS), terminal, user, subscriber, wireless node, and the like) and BSs.

In the Third Generation Partnership Project (3GPP) Long Term Evolution (LTE) Release-10 technical standards, transmissions from the BS comprise both data channels and control channels. The interference can affect both the data channels and control channels. While solutions exist to mitigate interference on the data channels, no such solution has been defined yet for the control channels.

SUMMARY OF THE DISCLOSURE

Example embodiments of the present disclosure which provide a system and method for transmission and reception of control channels in a communications system.

In accordance with an example embodiment of the present disclosure, a method for transmitting control information to a wireless node is provided. The method includes determining, by a communications controller, a region for the control information in a subframe as at least one of a data region and a control region of the subframe. The method also includes modulating, by the communications controller, the control information, and mapping, by the communications controller, the modulated control information onto resources of the subframe according to the determined region. The method further includes transmitting, by the communications controller, the subframe to the wireless node.

In accordance with another example embodiment of the present disclosure, a method for receiving control information is provided. The method includes determining, at a wireless node, a region indicator identifying a region for a control channel in a subframe as at least one of a data region and a control region of the subframe. The method also includes determining, at the wireless node, a location of resources for the control channel in the subframe according to the region indicator, and retrieving, at the wireless node, the control information from the determined location.

In accordance with another example embodiment of the present disclosure, a communications controller is provided. The communications controller includes a processor, and a transmitter operatively coupled to the processor. The processor determines a region for control information in a subframe as at least one of a data region and a control region of the subframe, modulates the control information, and maps the modulated control information onto resources of the subframe according to the determined region. The transmitter transmits the subframe to a wireless node.

In accordance with another example embodiment of the present disclosure, a wireless node is provided. The wireless node includes a processor. The processor determines a region indicator identifying a region for a control channel in a subframe as at least one of a data region and a control region of the subframe, determines a location of resources for the control channel in the subframe according to the region indicator, and retrieves control information from the determined location.

One advantage of an embodiment is that a U-PDCCH control region may be used to mitigate interference on the DL.

A further advantage of exemplary embodiments is that the U-PDCCH control region may be designed to manage interference in a Heterogeneous Network (HetNet) deployment or in a Cooperative Multipoint (CoMP) deployment.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

Figure 1:
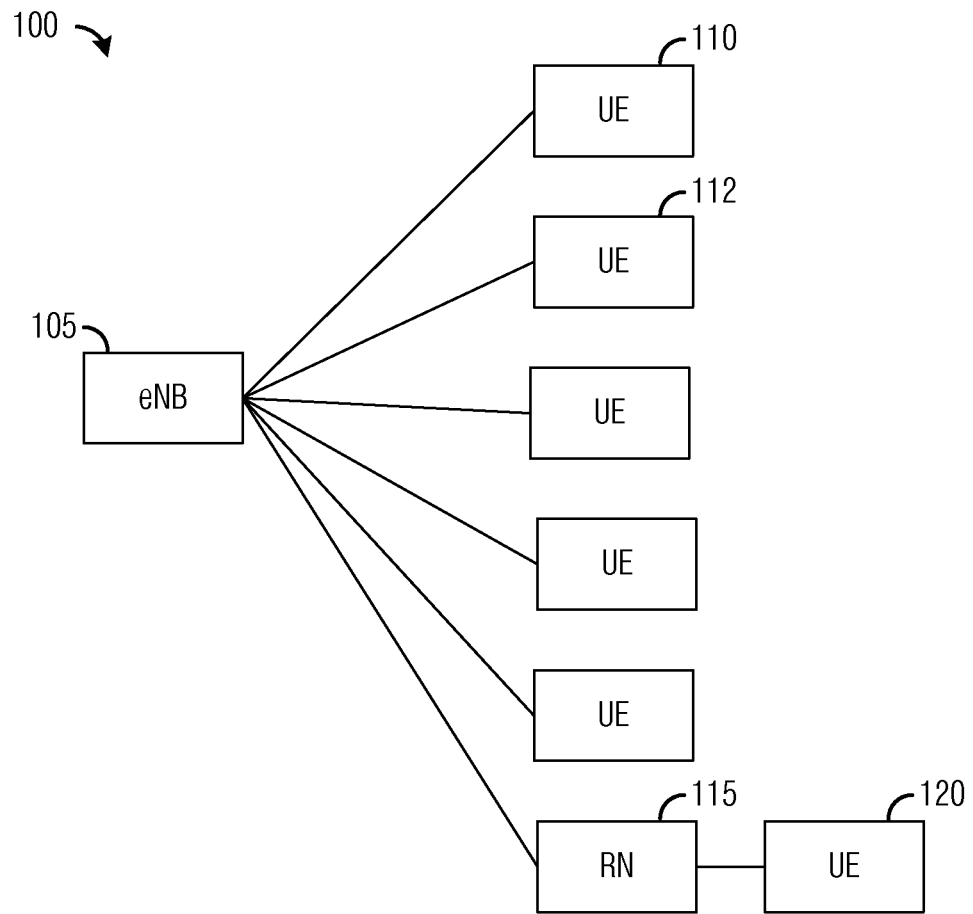
FIG. 1 illustrates an example communications system according to example embodiments described herein.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to transmission and reception of control channels in a communications system. For example, an eNB selects a region and transmits a first control channel in a first control region and/or a second control channel in a second control region. The first control region and the second control region may be part of a single subframe. The first control region and the second control region may be part of different subframes. The eNB may transmit sequences of subframes, with a first sequence of subframes including only first control channels and no second control channels, a second sequence of subframes including only second control channels and no first control channels, and a third sequence of subframes including both first control channels and second control channels. Each subframe in the sequences of subframes includes an indicator that indicates which control channel (or both) is transmitted.

The present disclosure will be described with respect to example embodiments in a specific context, namely a HetNet deployment including a 3GPP LTE compliant communications system. The disclosure may also be applied, however, to other HetNet deployments, such as those including 3GPP LTE-Advanced, WiMAX, and the like, compliant communications systems, as well as HetNet deployments with non-standards compliant communications systems.

For 3GPP LTE Release 10 (Release-10) and earlier technical standards, both a Physical Downlink Control Channel (PDCCH) and a Physical Downlink Shared Channel (PDSCH) are defined. The PDSCH may be used to carry data information. The PDCCH may convey control information about a particular PDSCH, such as resource allocation information, modulation and coding information, and information about a Physical Uplink Shared Channel (PUSCH). The PDCCH may be considered to be a first type of control channel. For brevity, the control information for PDSCH and PUSCH can be referred as resource allocation information.

The PDCCH may be located in the first several symbols (e.g., one to four symbols) of a subframe. These PDCCH-bearing symbols may be referred to as a control domain or a control region. Other symbols in the subframe may be used for data transmission, and may be referred to herein as a data domain or a data region. Hence the PDCCH is located in control region while the PDSCH is located in data region.

In the control region, there may be other control channels, such as a Physical Hybrid Indicator Channel (PHICH), which is used to transmit ACK/NACK in response to uplink data transmission, and the Physical Control Format Indicator Channel (PCFICH), which is used to indicate the number of symbols of a control region in a subframe.

In 3GPP LTE Release-11 (LTE-A) or beyond technical standards, an eNB locates a new type of control channel(s), which may be located in the data region, control region, or both of a subframe may be considered. More specifically, when the control channel is located in the data region, a second control region may be defined and uses a portion of the data region. The second control region comprising some combination of time and frequency resources, e.g., resource elements, with a group of resource elements forming a resource block (RB). For example, in one 3GPP LTE configuration, 84 resource elements make up a RB. Similarly, a group of resource elements forms a control channel element. For example, in one 3GPP LTE configuration, 36 resource elements make up a control channel element. At least part of the time and frequency resources (or simply, resources) of the second control region may be used for transmitting control information in the new type of control channel, e.g., a second type of control channel. The resources of the second control region that are not used for transmitting control information may be used for other purposes, such as transmitting data, e.g., on the PDSCH.

One or more resource elements or parts of resource blocks (RBs) from the data region may be allocated for the second control region. As an example, a new second type control channel, a UE Physical Downlink Control Channel (U-PDCCH), may be located in the second control region of the data region (or the control region or both the data region and the control region), and may carry control information for a PDSCH channel or control information for a PUSCH channel. The second channel may carry resource assignments for UEs or other network nodes such as relay nodes. Additionally, the second control region may carry channels analogous to those carried in the first control region, such as the physical hybrid automatic repeat requested indicator channel (PHICH), and the like. A prefix of "U-" may be added to indicate the analogous channel in the second control region, such as the "U-PHICH". Collectively, information carried in these control channels, such as resource assignments (also commonly referred to as resource allocation assignments), configuration information, power control, codebook information, hybrid automatic repeat requested (HARQ) information, and the like, may be referred to as control information. The format and content of these analogous channels may be different from the first control region.

In addition to the first type of control channel and the second type of control channel, there may be other control channel types, including a third type of control channel, which may be transmitted in both the first control region and in the second control region. The information in the two control regions may be the same or it may be different.

FIG. 1 illustrates a communications system 100. Communications system 100 includes an evolved NodeB (eNB) 105, which may also be commonly referred to as a controller, a communications controller, a base station, a NodeB, and the like. Communications system 100 also includes a plurality of User Equipment (UE), such as UE 110, 112, and 120. A UE may also be commonly referred to as a mobile, mobile station, subscriber, user, terminal, wireless node, and the like. In addition, the communication system may include other entities such as Relay Node (RN) 115. The RN may serve one or more UEs, such as UE 120.

Communications between eNB 105 and a given UE may occur over a link that comprises a Un downlink (DL) channel and an Un uplink (UL) channel. UEs not directly served by the RN and RNs may be multiplexed together using and may be allocated different RBs. For 3GPP LTE Release-10, the UE resource assignments are transmitted on the PDCCH.

While it is understood that communications systems may employ multiple eNBs capable of communicating with a number of UEs, only one eNB, a plurality of UEs, and one RN are illustrated for simplicity.

Figure 2A:
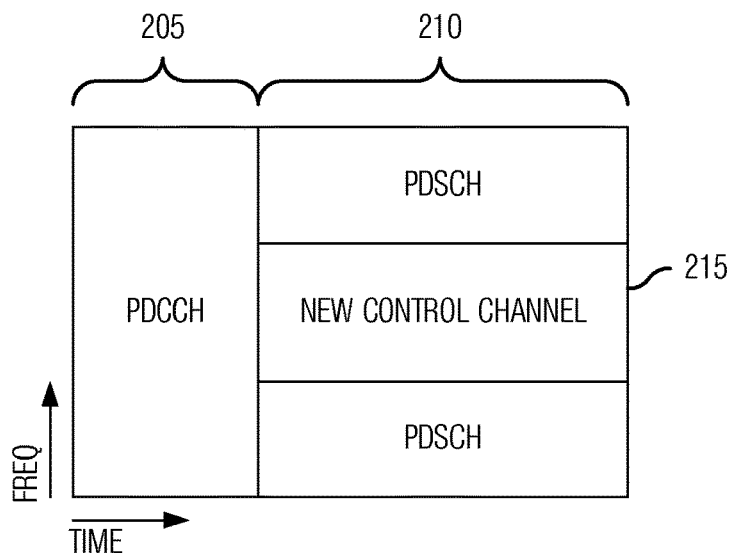
FIGS. 2a through 2d illustrate example subframes according to example embodiments described herein.

FIG. 2a illustrates a first subframe 200. Subframe 200 comprises a first control region 205 and a data region 210. Subframe 200 shows an example for a multicarrier modulation system. As discussed above, first control region 205 may include control signaling, such as a PDCCH, while data region 210 may include data as well as control signaling, which may include a PDSCH, as well as new control channels, such as a U-PHICH or a U-PDCCH.

First control region 205 may also be called a PDCCH control region and may contain the first type of control channels. The new control channels (e.g., the second type of control channels) are located in a new control region 215 (also commonly referred to as a second control region 215), which may be inside data region 210. New control region 215 can also be called the U-PDCCH control region. Although data region 210 may be used to transmit data, no data is shown in FIG. 2a. As shown in FIG. 2a, second control region 215 is located in data region 210, while PDCCH is located in first control region 205.

The representation of the various channels and regions in FIG. 2a is logical in nature with no direct relationship to an actual mapping of specific physical resources. In particular, the resources comprising second control region 215 may be distributed in frequency and are not restricted to be contiguous in frequency. Second control region 215 may also be time multiplexed with data, and for instance, may occupy only the first or the second slot of a subframe. In addition, second control region 215 may not necessarily start immediately after first control region 205, but may be offset by one or more symbols. Second control region 215 may consist of Physical RBs (PRBs) or Virtual RBs (VRBs), either localized or distributed. The PRBs and the VRBs comprise a plurality of resource elements.

Figure 2B:
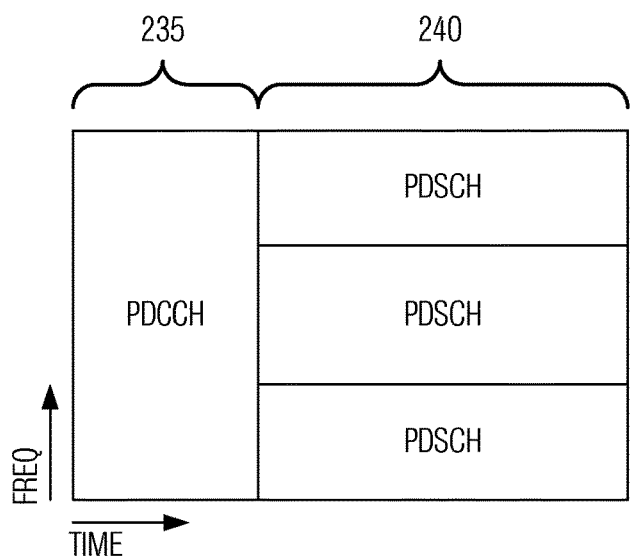

FIG. 2b illustrates a second subframe 230. Subframe 230 comprises a first control region 235 and a data region 240. As discussed above, first control region 235 may include control signaling, such as a PDCCH, while data region 240 may include data without control signaling. First control region 235 may also be called a PDCCH control region.

Figure 2C:
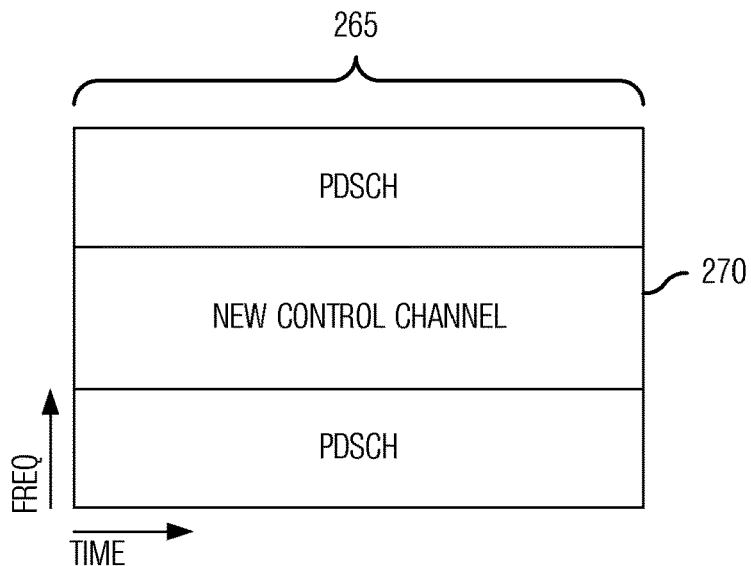

FIG. 2c illustrates a third subframe 260. Subframe 260 comprises a data region 265. As discussed above, data region 265 may include data as well as control signaling, which may include a PDSCH, as well as new control channels, such as a U-PDCCH or a U-PHICH. The new control channels are located in a new control region 270, which may be inside data region 265. New control region 270 may be used to transmit data, but no data is shown in FIG. 2c. As shown in FIG. 2c, new control region 270 is located in data region 265. It is noted that subframe 260 has no PDCCH since a first control region is absent.

Figure 2D:
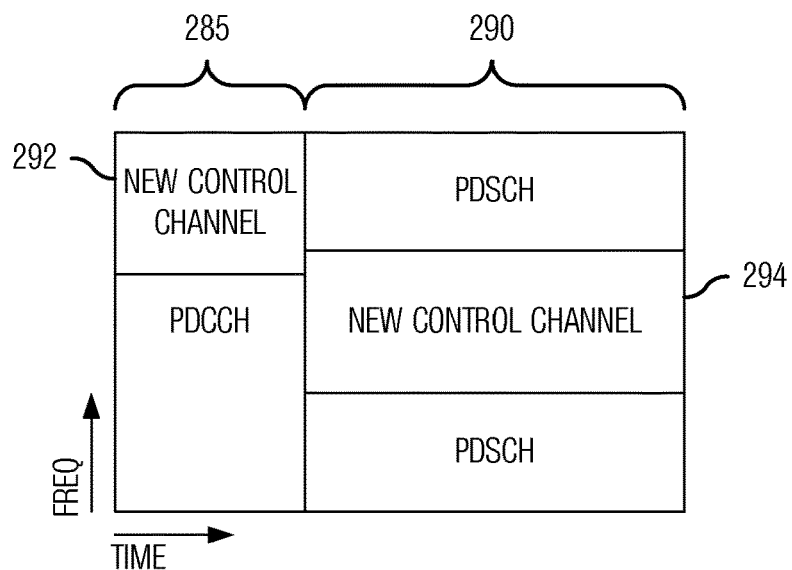

FIG. 2d illustrates a fourth subframe 280. Subframe 280 comprises a control region 285 and a data region 290. As discussed above, control region 285 may include control signaling, while data region 290 may include data as well as control signaling. The new control channel may be located in a first new control region 292, which may be inside control region 285, as well as in a second new control region 294, which may be inside data region 290.

In 3GPP LTE Release-10 and previous releases, a search space may be used to define possible locations for a PDCCH within the PDCCH control region. The PDCCH control region comprises one or more control channel elements (CCEs). There is a mapping procedure for assigning the resource elements that comprise each CCE to a both time location and frequency location, i.e., resources, within the PDCCH control region. A particular PDCCH may occupy 1, 2, 4, or 8 consecutive CCEs. A UE may use search space rules to identify possible CCEs that contain control information, such as, resource assignments (i.e., a PDCCH), for it. The search space rules may also have provisions for a common search space.

Figure 3A:
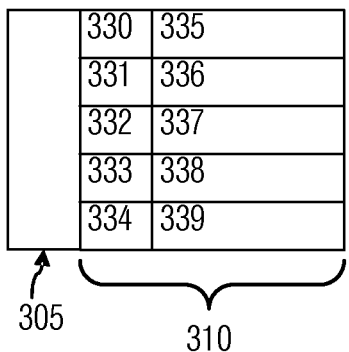
FIGS. 3a through 3e illustrate example locations for a second control region in a data region according to example embodiments described herein.

FIG. 3a illustrates a diagram of possible locations for a second control region in a data region 310 of a subframe. Also shown in FIG. 3a is a first control region 305. Data region 310 comprises one or more RBs (each of which comprises a plurality of resource elements or a plurality of control channel elements) in the first slot (RBs 330, 331, 332, 333, and 334) and one or more RBs in the second slot (RBs 335, 336, 337, 338, and 339). In FIG. 3a, examples of adjacent RBs in the first slot are 330 and 331, 331 and 332, and the like. Similarly, examples of adjacent RBs in the second slot are 336 and 337, 338 and 339, and the like.

Figure 3B:
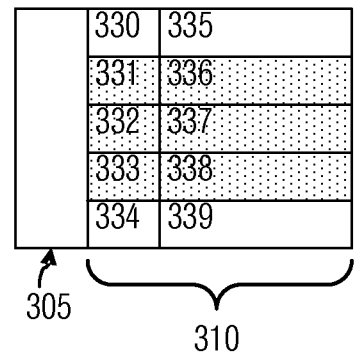
Figure 3C:
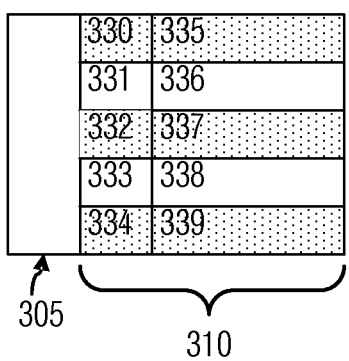

FIG. 3b illustrates an example U-PDCCH control region within data region 310 of a subframe, with the U-PDCCH control region occupying adjacent RBs. As shown in FIG. 3b, the U-PDCCH control region may occupy adjacent RBs, such as 331, 332, 333, 336, 337, and 338 for U-PDCCH 320. FIG. 3c illustrates an example U-PDCCH control region with data region 310 of a subframe, with the U-PDCCH control region occupying distributed VRBs. As shown in FIG. 3c, the U-PDCCH control region may occupy distributed VRBs using 330, 332, 334, 335, 337, and 339 for U-PDCCH 321.

Figure 3D:
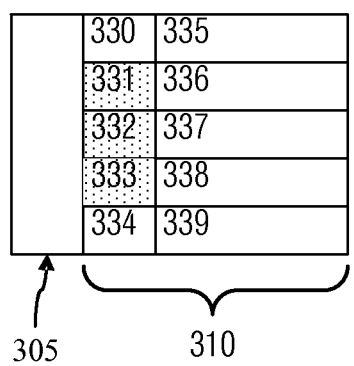
Figure 3E:
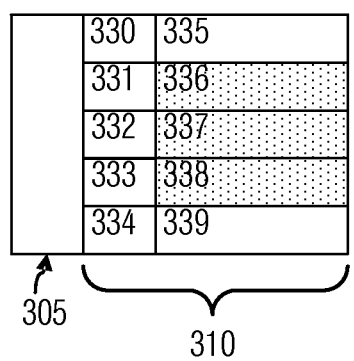

FIG. 3d illustrates an example U-PDCCH control region within data region 310 of a subframe, with the U-PDCCH control region occupying first slot RBs. As shown in FIG. 3d, the U-PDCCH control region may occupy the first slot using RBs 331, 332, and 333 for U-PDCCH 322. FIG. 3e illustrates an example U-PDCCH control region within data region 310 of a subframe, with the U-PDCCH control region occupying second slot RBs. As shown in FIG. 3e, the U-PDCCH control region may occupy the second slot using 336, 337, and 338 for U-PDCCH 323. It is also noted that the U-PDCCH control region may occupy RBs that are combinations of those illustrated herein. It is noted that although first control regions are shown in FIGS. 3a through 3e, in some subframes, the first control region may be absent.

In a communications system with relay nodes, a R-PDCCH may be used to transmit control signaling for notifying RNs of the DL and/or UL grants on the Un link (the link between the eNB and the RN). However, the R-PDCCH may have limitations if it were used for UEs. The R-PDCCH may be used as a basis for designing a new control channel (herein referred to as a U-PDCCH) to allow UEs to be notified of their UL and/or DL grants.

There are some benefits of having a U-PDCCH and/or a U-PHICH. The U-PDCCH and the U-PHICH, as well as other control channels located in the data region (i.e., the second control region), may be referred to as data region control channels. For example, different cells may allocate orthogonal time-frequency resource (different second control regions) for the U-PDCCH and/or U-PHICH, thus the interference between U-PDCCH and/or U-PHICHs of different cells is significantly lowered. Another benefit may be that a dedicated reference signal can be used for the second control region, in other words, second control region has its own reference signal for channel estimation during demodulation, thereby allowing more advanced transmission schemes, such as beam forming or precoding.

There are some benefits of having a PDCCH and a U-PDCCH and/or a U-PHICH. The PDCCH may be detectable by legacy UEs, which would not be able to detect the U-PDCCH and/or a U-PHICH. Furthermore, the ability to distribute some of control information to the U-PDCCH and/or the U-PHICH may enable the eNB to perform load balancing on the different control channels. Additionally, if the transmission of control information on a particular control region (e.g., the first control region or the second control region (i.e., the data region)) is failing, it may be possible to use a different control region to potentially achieve better transmission performance, Several properties make the U-PDCCH control region (the second control region or the data region) an attractive solution to mitigate the effects of interference on the DL:

1. A U-PDCCH control region may occupy a subset of frequency resources, thereby providing orthogonality for control channels in frequency domain from different HetNet layers unlike other time division multiplex (TDM) HetNet solutions (e.g., almost blank subframe (ABS)) which may provide orthogonality in time domain;

2. A U-PDCCH control region does not disrupt or conflict with the current physical data control channel (i.e., a PDCCH), so prior release UEs (i.e., legacy UEs) are not impacted and are without a reduction in peak data rate if the resource allocation of the U-PDCCH control region can be released dynamically which may be a problem with other frequency division multiplex (FDM) HetNet solutions;

3. With a U-PDCCH control region, it may be possible to reduce the number of symbols used for a PDCCH control region, thus to improve the overall capacity (e.g., the time granularity is 1/14th in time with a normal cyclic prefix (CP), but can be much lower in frequency, e.g., 1/50th for a 10 MHz deployment); and 4. It may be possible to use a Demodulation Reference Signal (DMRS) on the U-PDCCH control region. The use of the DMRS could create a more efficient control channel that may take advantage of technologies such as dynamic link adaptation, frequency selective resource allocation, and Multiple Input, Multiple Output (MIMO) transmission. Some of these improvements can be done for the PDCCH (e.g., link adaptation), but, for example, Multi-User MIMO (MU-MIMO) is better suited for the U-PDCCH.

Comparing to a backhaul link between a Donor eNB (DeNB) and the Relay Node (RN), there may be some unique properties of the access link between the eNB and the UE and hence some issues that should be considered:

a) A UE is generally mobile while a RN is typically stationary. This implies that fast link adaptation is more beneficial and desirable, and at the same time more difficult. A difficulty is due to the lack of another control channel to inform the transmission format of U-PDCCH as in the case of PDSCH. Another related issue is that due to mobility of the UE, the re-transmission rate for PDSCH of a UE tends to be higher than that of a RN;

b) A UE may read a PDCCH while a RN cannot. Therefore, PDCCH and U-PDCCH may co-exist for a UE and designs are needed to cope with and take advantage of the co-existence;

c) Since the number of UEs associated with a cell is typically be much larger than the number of RNs, a more efficient design of the U-PDCCH may be required to reduce overhead and ensure high performance;

d) Because the location of a RN can be carefully selected, it generally sees better channel quality compared to a UE. Therefore, there is a higher requirement for interference management for the UE, especially for the control channel; and e) No switching time is needed for a UE as in the case of RN.

The following is a discussion of exemplary scenarios illustrating the attractiveness of a U-PDCCH.

Scenario 1: HetNet Deployment

A HetNet deployment typically has an aggressor layer and a victim layer. At a given location in a deployment, the power received from an aggressor layer may be much greater than the power received from the victim layer. As an example, in a first deployment, a macro layer may be considered an aggressor to a victim pico layer. Alternatively, in a second deployment, a femto layer may be considered an aggressor to a victim macro layer. Taking as an example the macro-pico HetNet deployment scenario as described above, the macro cell layer may use the regular PDCCH as specified in 3GPP LTE Release-10. Data for macro-UEs, which are UEs assigned to a macro cell layer, can be scheduled anywhere in the data region. For example, to mitigate interference, power control can be applied on the downlink control channels so that low-power transmissions can be used for macro UEs. As a result, the macro cell layer can have a PDCCH for each subframe while the pico cell layers can use either PDCCH or U-PDCCH. It is noted that this is just one of many possible scenarios. For other scenarios, it can be beneficial for the macro layer to have a U-PDCCH as well.

Scenario 1a: Fixed Assignment of U-PDCCH to UEs

Figure 3F:
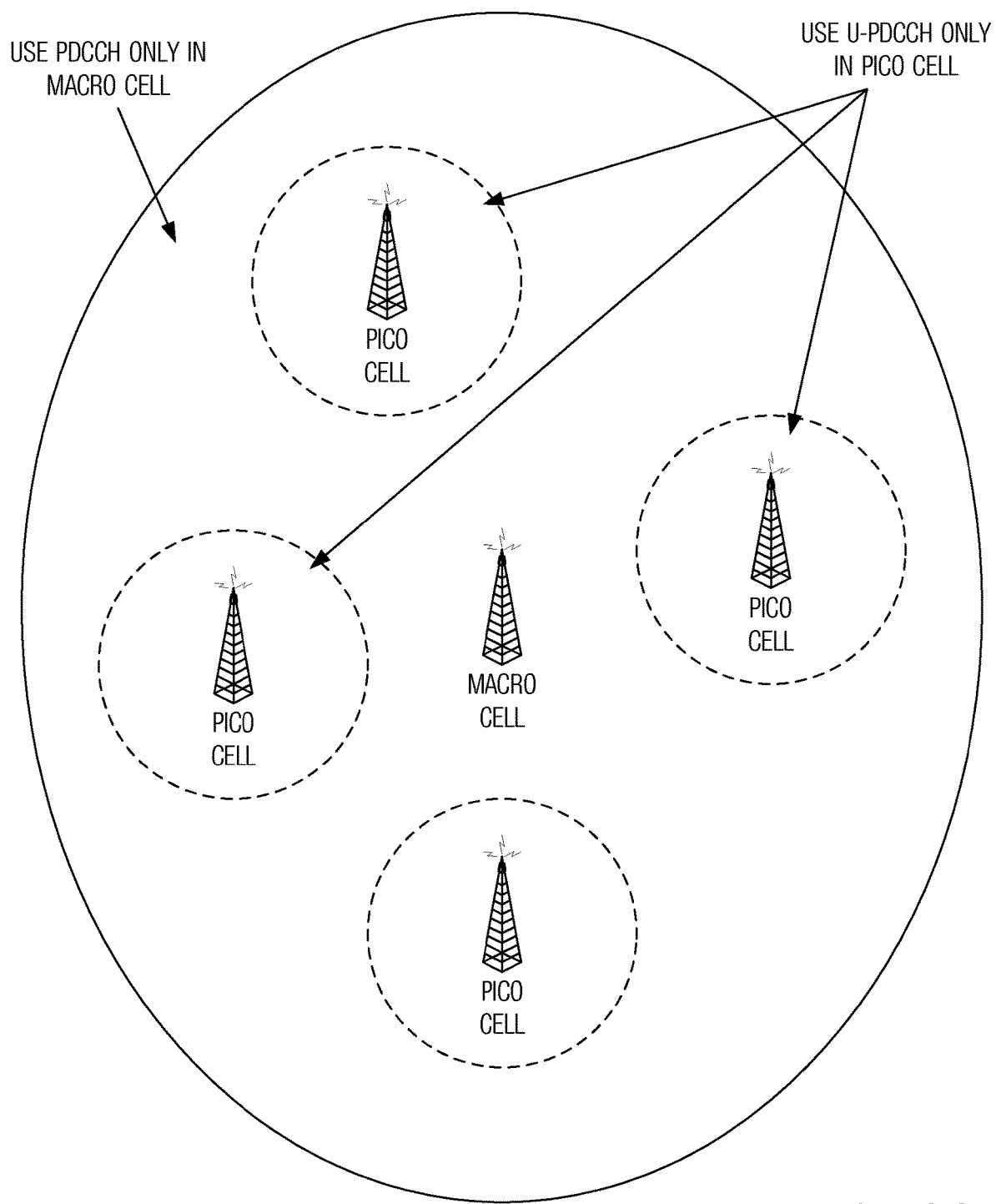
FIG. 3f illustrates an example HetNet communications system configured with fixed assignment of U-PDCCH to UEs according to example embodiments described herein.

In scenario 1a, pico-UEs, i.e., UEs assigned to a pico cell layer, are assigned one control channel only. Some UEs receive their assignments on the U-PDCCH only while other UEs receive their assignment on the regular PDCCH. The latter case may be needed for legacy UEs, for example. The pico eNB needs to transmit at least a common reference signal (CRS) on the PDCCH, with possibly more information, similar to Almost Blank Subframes (ABS). It is noted that the U-PDCCH may be interfered with by a reference signal (RS) sent by the macro cell. Muting and/or puncturing may be needed to mitigate the interference. FIG. 3f illustrates a HetNet communications system configured with a fixed assignment of U-PDCCH to UEs.

Scenario 1b: Flexible Assignment of U-PDCCH to UEs

Figure 3G:
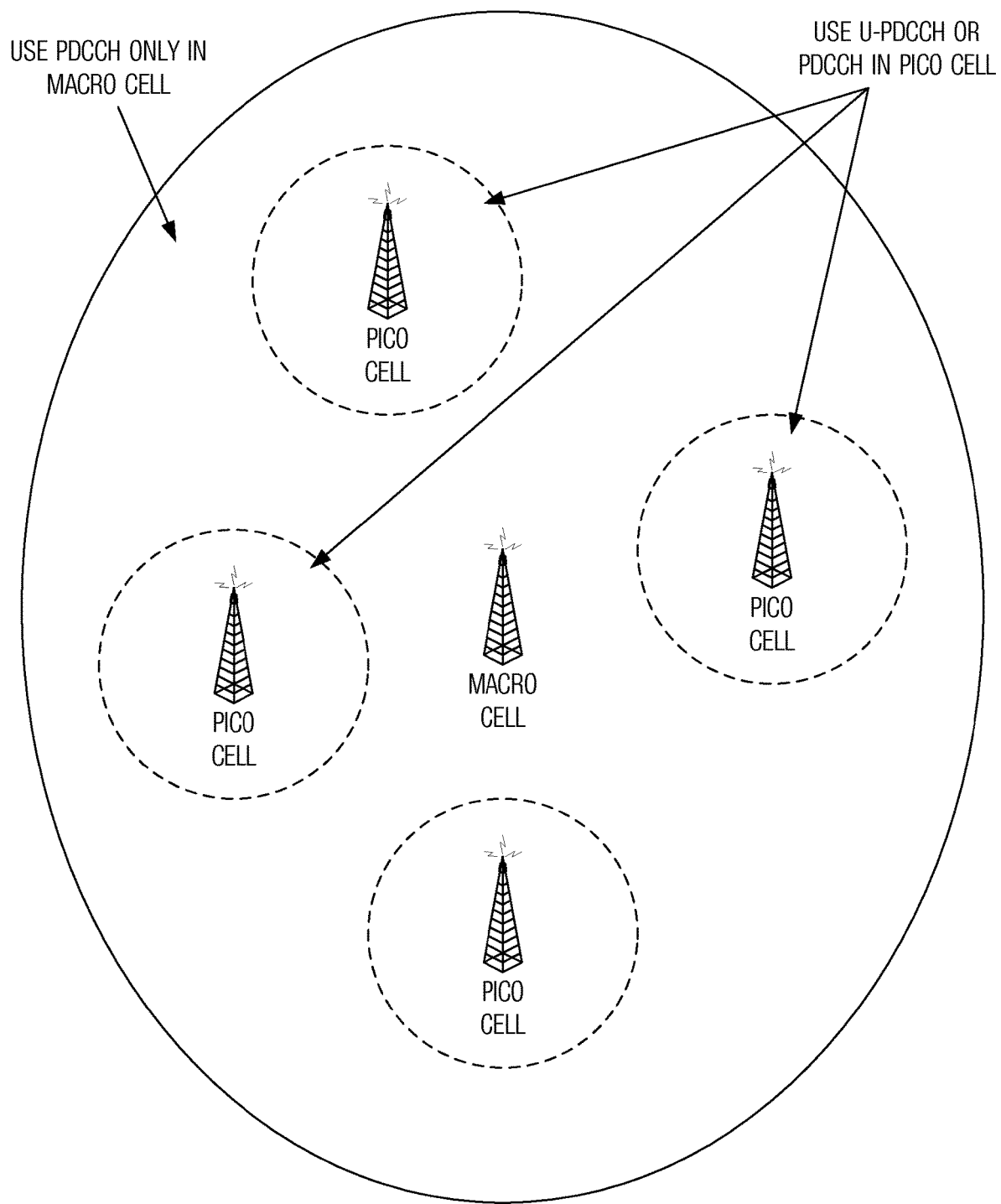
FIG. 3g illustrates an example HetNet communications system configured with flexible assignment of U-PDCCH to UEs according to example embodiments described herein.

In scenario 1b, the pico UEs may receive assignments either on the PDCCH or the U-PDCCH. For instance, pico UEs severely interfered by the macro cell's PDCCH may switch to the U-PDCCH while UEs having a manageable level of interference (e.g., UEs close to the pico cell) may continue to use the PDCCH. It is noted that the dynamic switching mechanism may also be useful to perform load balancing on the control channel region, for example. FIG. 3g illustrates a HetNet communications system configured with flexible assignment of U-PDCCH to UEs.

Scenario 2: CoMP Deployment

In scenario 2, the U-PDCCH may be used to avoid a potentially high level of interference between the PDCCH from two cells. A PDCCH in a first cell and a U-PDCCH in a second cell may be made orthogonal to help reduce interference. Orthogonalization is discussed in greater detail below. As in scenarios 1a and 1b discussed previously, fixed assignment and flexible assignment of the U-PDCCH may be used.

In some scenarios, both PDCCH and U-PDCCH may coexist in a single cell and are transmitted by the same eNB (e.g., scenario 1a discussed above). Therefore, there may be a need for protocol and signaling to a UE to have the UE switch from monitoring the PDCCH control region to monitoring the U-PDCCH control region and vice versa.

Figures 4A, 4B:
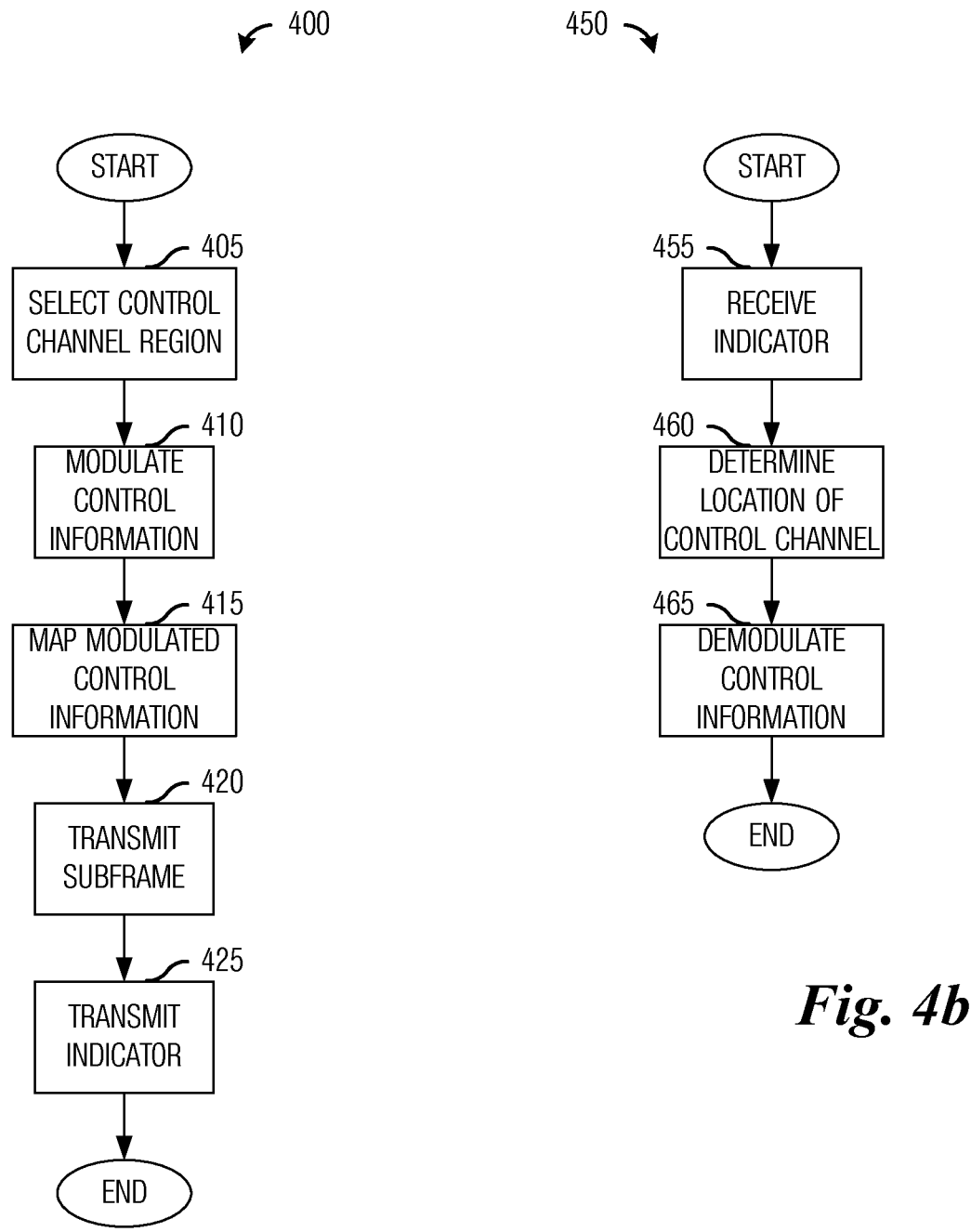
FIG. 4a illustrates an example flow diagram of eNB operations in notifying a UE to monitor a PDCCH control region or a U-PDCCH control region or both control regions according to example embodiments described herein.
FIG. 4b illustrates an example flow diagram of UE operations in monitoring either a PDCCH control region or a U-PDCCH control region or both control regions according to example embodiments described herein.

FIG. 4a illustrates a flow diagram of eNB operations 400 in notifying a UE to monitor a PDCCH control region or a U-PDCCH control region or both control regions. eNB operations 400 may be indicative of operations occurring in an eNB, such as eNB 105, as the eNB notifies a UE to monitor a PDCCH control region or a U-PDCCH control region or both control regions.

eNB operations 400 may begin with the eNB selecting a region for a control channel to use to transmit control information, such as a resource allocation, to the UE (block 405). As discussed above, the control channel may be located in a data region, a control region, or both the data region and the control region. A control channel type may indicate the region of the control channel. As discussed previously, there may be a number of different control channel types. As an example, there may be a first control channel type where the control channels are transmitted in a first control region of a subframe. There may also be a second control channel type where the control channels are transmitted in a second control region of the subframe, i.e., in a data region of the subframe. There may also be a third control channel type where the control channels are transmitted in both the first control region and the second control region of the subframe.

As an example, the eNB may select the region of the control information according to availability of resources in the subframe. As another example, the eNB may select the region of the control information with or without consideration of a type of control information. As another example, the eNB may select the region of the control information with or without consideration of a type of the control channel.

The eNB may then transmit the control information, e.g., resource allocation (or resource allocation information), to the UE. The transmitting of the control information to the UE may include the eNB modulating the control information according to a selected modulation and/or coding scheme, such as Quadrature Phase Shift Keyed (QPSK), 16 Quadrature Amplitude Modulation (16-QAM), 64 Quadrature Amplitude Modulation (64-QAM), and the like (block 410), mapping the modulated control information to a plurality of resources, such as resource blocks, control channel elements, or resource elements, where the modulated control information may be mapped (e.g., assigned) to the plurality of resources that are located in a portion of the subframe according to the region (which may be indicated by the control channel type, for example) selected by the eNB (block 415), and transmitting the subframe (block 420). As an example, if the eNB selected a first control region (e.g., indicated by a first control channel type), then the control information may be located on a plurality of resources in the first control region, while if the eNB selected a second control region (e.g., indicated by a second control channel type), then the control information may be located on a plurality of resources in the second control region, and if the eNB selected both the first control region and the second control region (e.g., indicated by a third control channel type), then the control information may be located on a plurality of resources in both the first control region and the second control region.

In addition to transmitting the control information to the UE, the eNB may also transmit an indicator to the UE (block 425). As an example, the indicator may identify a region for the control channel used to transmit the control information to the UE. As another example, the indicator may identify the type of the control channel used to transmit the control information to the UE. For example, the indicator may indicate that a first control channel type, a second control channel type, or a third control channel type was used to transmit the resource allocation to the UE.

FIG. 4b illustrates a flow diagram of UE operations 450 in monitoring either a PDCCH control region or a U-PDCCH control region or both control regions. UE operations 450 may be indicative of operations occurring in a UE, such as UE 110 and UE 120, as the UE monitors either the PDCCH control region or the U-PDCCH control region or both control regions.

UE operations 450 may begin with the UE determining, e.g., receiving, an indicator (block 455). As an example, the indicator may identify the region for a control channel used to transmit control information to the UE. As another example, the indicator may indicate the type of control channel used to transmit control information, e.g., resource allocation information to the UE. For example, the indicator may indicate that a first control channel type, a second control channel type, or a third control channel type was used to transmit the resource allocation to the UE.

The UE may determine the location of the control channel in the control region according to the indicator (block 460). As an example, if the indicator identifies the region of the control channel, the UE may know where in the subframe to look for the control channel. As another example, if the indicator identifies that the first type of control channel was used, then the UE knows that the resource allocation may be found in the first control region. Similarly, if the second type of control channel was used, then the UE knows that the resource allocation may be found in the second control region, and if the third type of control channel was used, then the UE knows that the resource allocation may be found in both the first control region and the second control region. The UE may retrieve, e.g., demodulate, information in the resource elements in location of the control channel determined according to the indicator (block 465). As an example, the UE may use a demodulation and/or decoding scheme, such as QPSK, 16-QAM, 64-QAM, and the like, to demodulate the information in the resource elements to obtain the control information.

Figure 4C:
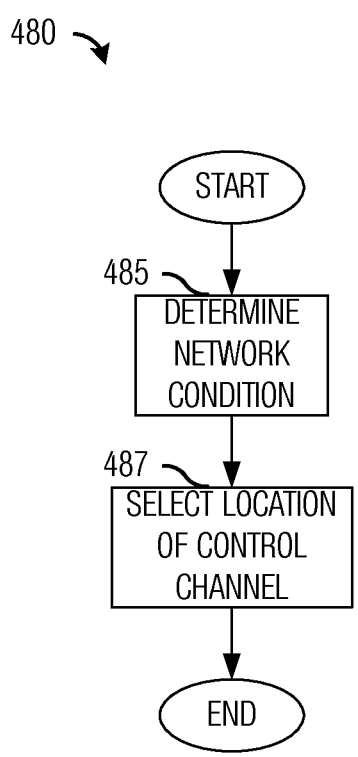
FIG. 4c illustrates an example flow diagram of eNB operations in selecting a region for a control channel according to example embodiments described herein.

FIG. 4c illustrates a flow diagram of eNB operations in determining a region for a control channel. eNB operations may be indicative of operations occurring in an eNB, such as eNB 105, as the eNB determines a region for a control channel in a subframe.

eNB operations may begin with the eNB determining a network condition (block 485). As an example, the eNB may determine an error rate of previous control channel transmissions in a first control region, a second control region (i.e., a data region), and both the first control region and the second control region. As another example, the eNB may determine UE capability. As another example, the eNB may determine a load on the control regions. As another example, the eNB may determine a link quality or link condition (e.g., interference, signal to interference plus noise ratio, signal to noise ratio, and the like), which may allow or prevent the use of advance transmission techniques, such as beam forming, precoding, and the like.

The eNB may select a region for the control channel according to the network condition (block 487). As an example, if link quality or link conditions allow the use of advanced transmission techniques (and if the UE is capable), then the eNB may select the second control region to transmit the control channel or both the first control region and the second control region to transmit the control channel. As another example, if the UE is not capable, then the UE may select the first control region to transmit the control channel.

A solution may be to signal a UE to switch its monitoring between the PDCCH control region and the U-PDCCH control region (and vice-versa) using higher layer signaling, e.g., radio resource control (RRC) signaling. As an example, an eNB may send a command to a UE to switch. For instance, assume that eNB 105 wants to notify UE 120 to switch from monitoring the PDCCH control region to the U-PDCCH control region.

Figures 5A, 5B:
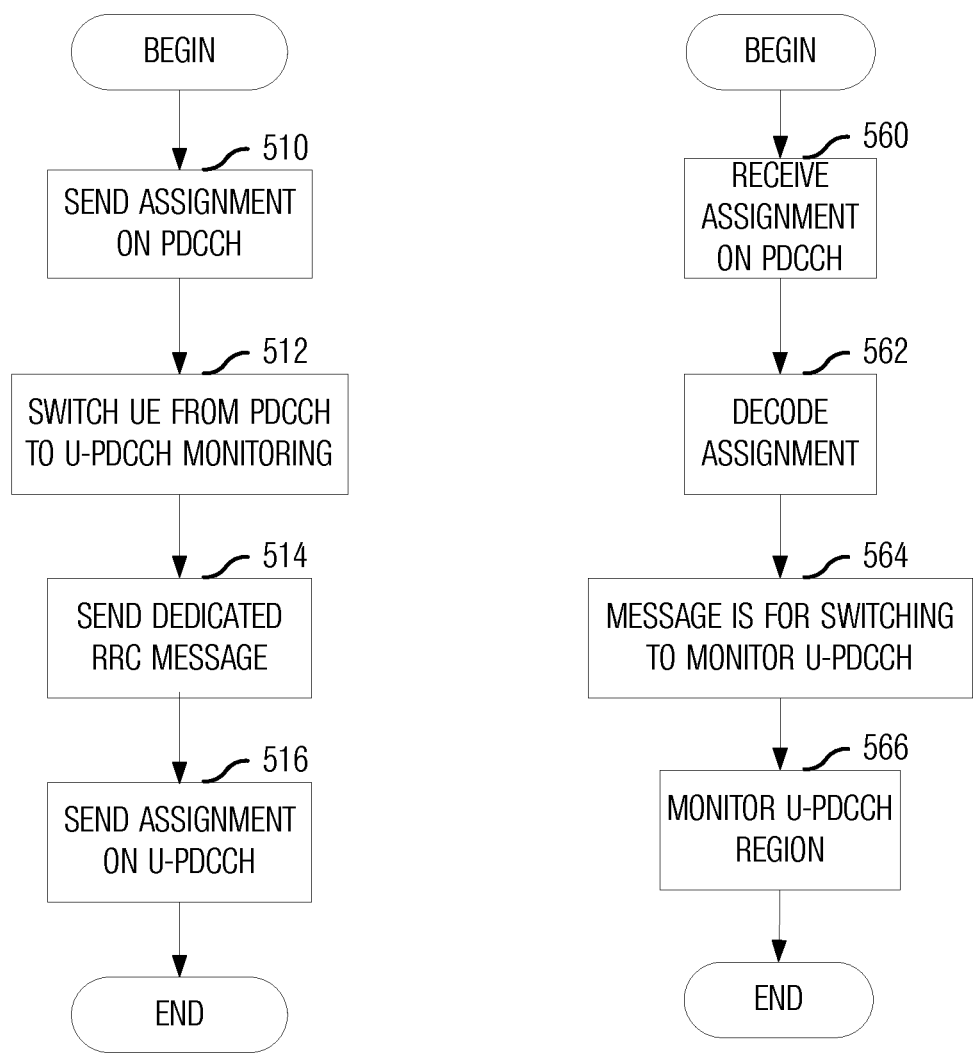
FIG. 5a illustrates an example flow diagram of eNB operations in switching a UE from monitoring a PDCCH control region to a U-PDCCH control region according to example embodiments described herein.
FIG. 5b illustrates an example flow diagram of UE operations in switching from monitoring a PDCCH control region to a U-PDCCH control region according to example embodiments described herein.

FIG. 5a illustrates a flow diagram of operations 500 of an eNB as the eNB notifies a served UE to switch the control region that it is monitoring. Operations 500 may be indicative of operations occurring in an eNB, such as eNB 105, as the eNB notifies a UE that it is serving to monitor a different control region and a different control channel.

Operations 500 may begin with the eNB sending a resource assignment to a UE, such as UE 120, using the PDCCH, located in the PDCCH control region (block 510). The eNB may determine that there is a need to switch the UE from the PDCCH control region to the U-PDCCH control region (block 512). The eNB may decide to switch the UE for several reasons including, but not limited to performing load balancing between the two control regions, or because a UE suffers from severe interference on its control region. The eNB may send a dedicated RRC message (e.g., containing an indicator) to the UE to notify the UE to switch to the U-PDCCH region monitoring mode (block 514). As an example, the dedicated RRC message may specify the UE should switch the control region that it is monitoring, e.g., from the first control region to the second control region or from the second control region to the first control region.

For subsequent resource assignments for the UE, the eNB may use the U-PDCCH, located in the U-PDCCH control region, to send the resource assignments (block 516). The operation from switching a served UE from U-PDCCH monitoring to PDCCH monitoring is similar to what is described in FIG. 5a for the eNB.

There are two search spaces in the PDCCH control region—one is a UE-specific search space and the other is a common search space. The UE may continue to monitor the PDCCH control region for PDCCH that are assigned on the common search space even after it performs the switch of the control channels. In this example, the switch is from the PDCCH in a UE-specific search space within the PDCCH control region to the U-PDCCH. After switching to the U-PDCCH, the UE may continue to monitor the common search space in the PDCCH control region.

FIG. 5b illustrates a flow diagram of operations 550 of a UE as the UE switches control region monitoring. Operations 550 may be indicative of operations occurring at a UE, such as UE 120, as the UE switches control region monitoring according to a notification from an eNB that is serving the UE.

Operations 550 may begin with the UE receiving an assignment in the PDCCH region (block 560). The UE may decode data received on resources assigned in assignment received in block 560 (block 562), and the UE may identify the message as RRC signaling to indicate that it is to start monitoring the U-PDCCH control region (block 564). The UE may begin monitoring the U-PDCCH control region for future resource assignments (block 566). The operations for the UE switching from U-PDCCH monitoring to PDCCH monitoring may be similar. It is noted also that the RRC message may be sent over one or several frames. If received over several frames, the UE may need to concatenate all received portions of the message before decoding it, but operation is similar to that described in FIG. 5b.

Higher layer signaling may be attractive if switching is not a very frequent occurrence. With higher layer signaling, there may be a time ambiguity wherein there is latency between when the signaling switch is commanded by the eNB and when the UE actually switches. Therefore, before the UE explicitly acknowledges receipt of the higher layer signaling, the UE may not be able to receive the PDCCH and/or the U-PDCCH for several frames. During the time ambiguity, the UE may have to monitor both control channels (the PDCCH and the U-PDCCH). The monitoring of both the PDCCH and the U-PDCCH with a reduced search space may be a safe fallback state. To help reduce performance overhead on the UE, a reduced search space may be used to help ensure a constant requirement on a number of blind decoding attempts performed by the UE.

Using both the PDCCH and the U-PDCCH may also be an option for a normal mode of operation, i.e., the UE may monitor either the PDCCH or the U-PDCCH or both the PDCCH and the U-PDCCH.

Figure 6A:
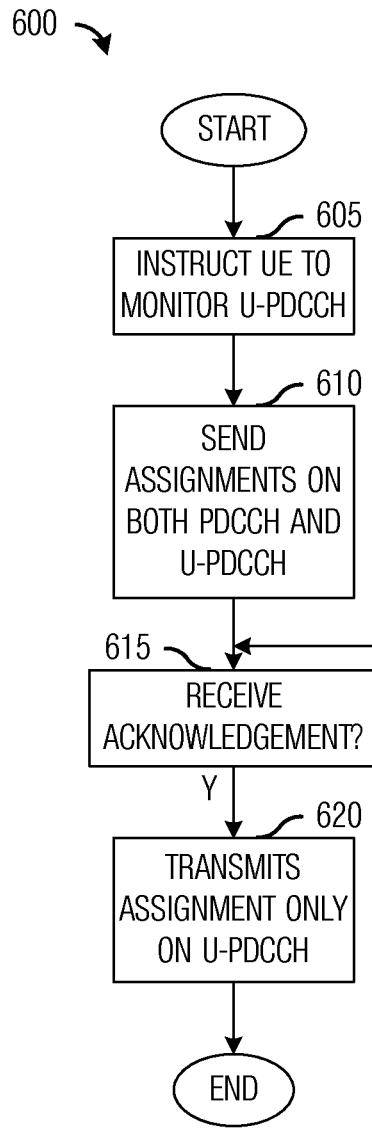
FIG. 6a illustrates an example flow diagram of eNB operations for controlling the control channel monitoring of a UE according to example embodiments described herein.

FIG. 6a illustrates a flow diagram of eNB operations 600 for controlling the control channel monitoring of a UE. eNB operations 600 may be indicative of operations in an eNB, such as eNB 105, as the eNB controls the monitoring of control channels by a UE.

The eNB may instruct the UE to monitor a U-PDCCH (or a PDCCH or both the PDCCH and the U-PDCCH) (block 605). The eNB may instruct the UE by sending a higher layer signaling message, such as with a RRC message. Alternatively, the eNB may instruct the UE to switch the control channel it is monitoring, e.g., if the UE is monitoring a PDCCH, then the UE switches to the U-PDCCH, while if the UE is monitoring the U-PDCCH, then the UE switches to the PDCCH and the U-PDCCH, while if the UE is monitoring the PDCCH and the U-PDCCH, then the UE switches to the PDCCH. It is noted that other switching sequences may be possible, as long as both the eNB and the UE know the switching sequence to be used.

In order to handle time ambiguities and to allow the UE time to switch, the eNB may continue for a period of time to send assignments on both the PDCCH and the U-PDCCH (block 610). Once the eNB receives an acknowledgement from the UE (block 615) as indicated by 'Y', the eNB may continue to send assignments only on the U-PDCCH (or the PDCCH if the UE is monitoring the PDCCH) (block 620). A timer can be used to measure the period of time.

Figure 6B:
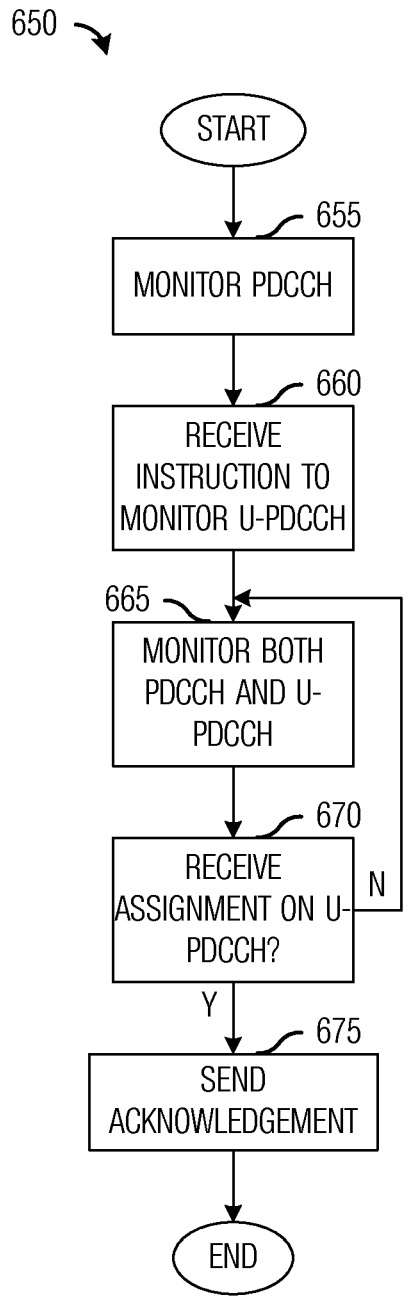
FIG. 6b illustrates an example flow diagram of UE operations for monitoring of a control channel by a UE according to example embodiments described herein.

FIG. 6b illustrates a flow diagram of UE operations 650 for monitoring of a control channel by a UE. UE operations 650 may be indicative of operations occurring in a UE, such as UE 110 and UE 120, as the UE monitors control channels.

UE operations 650 may begin with the UE monitoring the PDCCH, which may be a system default (block 655). Upon receiving a message from the eNB which may tell it which control channel to monitor (e.g., the PDCCH, the U-PDCCH, or both the PDCCH and the U-PDCCH) or to simply switch the control channel it is monitoring (block 660), the UE may handle time ambiguities inherent in higher layer signaling by monitoring both the PDCCH and the U-PDCCH regardless of the actual instruction from the eNB, as an example (block 665).

The UE may continue monitoring both the PDCCH and the U-PDCCH until it receives an assignment on the U-PDCCH (or whichever control channel specified by the eNB) (block 670) as indicated by 'N'. After receiving the assignment as indicated by 'Y', the UE may send an acknowledgement to the eNB (block 675).

It is noted that the acknowledgement from the UE may not necessarily be needed. For example, the eNB may use both the U-PDCCH and the PDCCH for a given period of time and then stop using both control channels once the period of time expires. A timer can be used to determine whether a period of time has expired, thereby negating the need for the acknowledgement. As an example, the timer may be set to be equal to (or greater than by an adjustable factor) a period of time that is typical for the period of ambiguity involved RRC signaling.

The acknowledgement may be signaled in an implicit manner. The PDCCH and U-PDCCH may contain different resource assignments, so an acknowledgement for a DL transmission or receiving correctly an UL transmission may indicate that the switch occurred correctly, as an example.

Figures 7A, 7B:
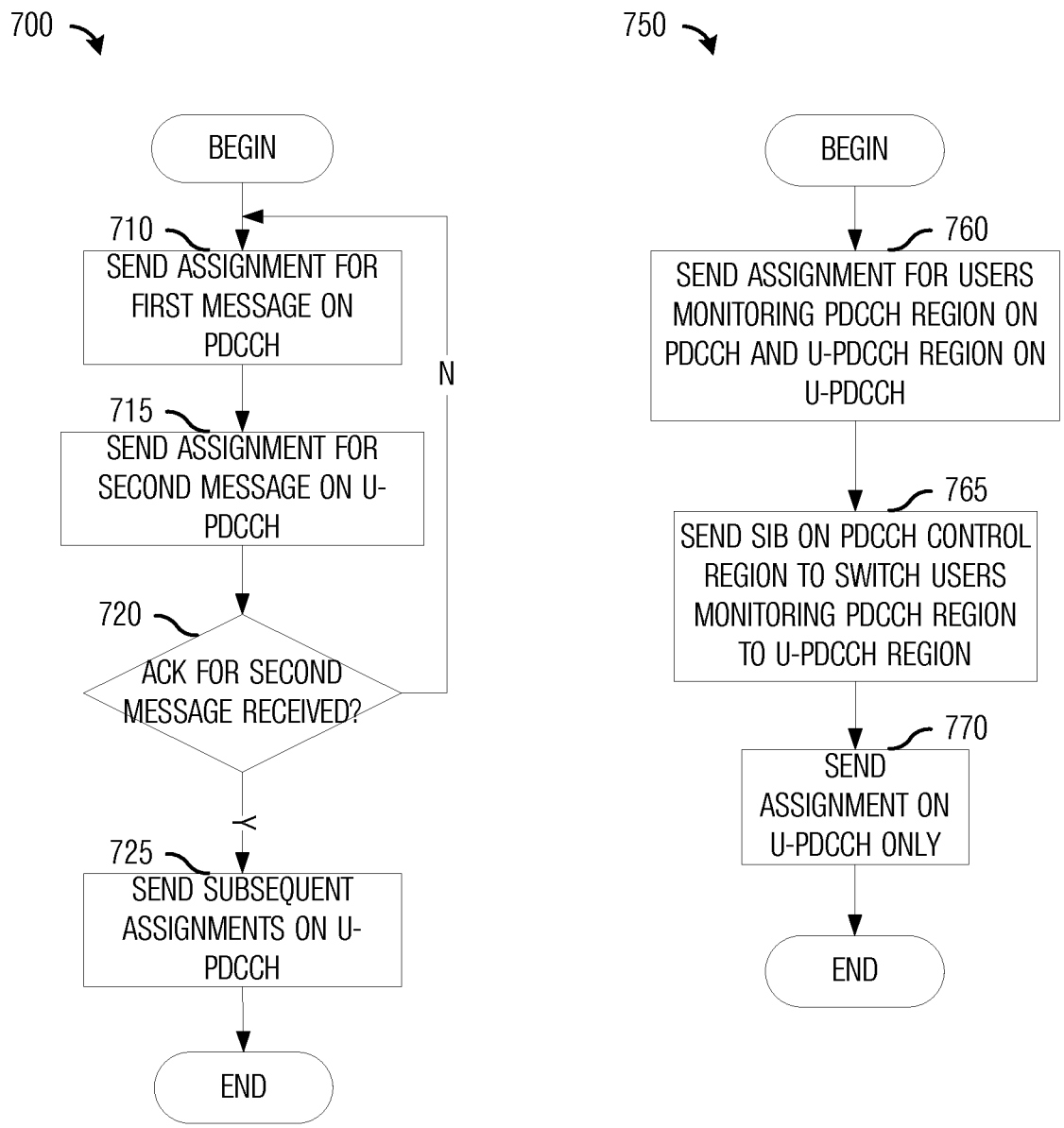
FIG. 7a illustrates an example flow diagram of eNB operations in switching a UE from monitoring a PDCCH control region to a U-PDCCH control region with implicit acknowledgement according to example embodiments described herein.
FIG. 7b illustrates an example flow diagram of UE operations in switching from monitoring a PDCCH control region to a U-PDCCH control region with implicit acknowledgement according to example embodiments described herein.

FIG. 7a illustrates a flow diagram of eNB operations 700 in an eNB for making assignments on control channels. eNB operations 700 may be indicative of operations occurring in an eNB, such as eNB 105, as the eNB makes assignments to UEs on control channels.

eNB operations 700 may begin with an eNB, such as eNB 105, sending an assignment to a UE, such as UE 120, for a first message on the PDCCH (block 710). The eNB may also send a second assignment to the UE for a second message on the U-PDCCH (block 715). It is noted that the content of the two messages may be the same, but they may be carried on different network resources and have a different packet IDs, for example. The eNB may then monitor for received acknowledgements (block 720). If an acknowledgement is received for the second message as indicated by 'Y', the eNB may then know that the UE has decoded the U-PDCCH, thus has correctly processed the RRC signaling to switch channels. The eNB then sends subsequent resource assignment on the U-PDCCH (block 725). If an acknowledgement was not received as indicated by 'N', the eNB continues sending dual assignments by returning to block 710.

It is noted that in the above description, the received acknowledgment may not imply a packet acknowledgement, but may instead be an indication that the assignment has been received by the UE. For example, if the second message for packet I is not correctly decoded by the UE, the UE may send a negative acknowledgment (NACK) for packet I. Upon receiving the NACK, the eNB may be aware that the second assignment was received correctly by the UE because the UE would not transmit an acknowledgement (ACK) or NACK if it did not receive an assignment for packet I. After receiving the NACK, the eNB may stop sending assignments for that particular UE on the PDCCH, and may use the U-PDCCH only.

As an example, which control channel to be monitored by a UE is UE specific by default. However, this information may also be configured as a combination of a cell default in a system information block (SIB) and a UE specific override. A control message sent on a SIB may be used to signal to a UE to switch its monitoring of the PDCCH to the U-PDCCH and vice-versa. When a control message on a SIB is used, either the U-PDCCH or the PDCCH is needed to schedule the control message, i.e., provide allocation information to the UE.

FIG. 7b illustrates a flow diagram of eNB operations 750 in an eNB as the eNB specifies which control region is monitored by a UE. eNB 750 may be indicative of operations occurring in an eNB, such as eNB 105, as the eNB uses a SIB to specify which control region a UE monitors.

eNB operations 750 may begin with the eNB sending assignments on the PDCCH for UEs monitoring the PDCCH, and on the U-PDCCH for UEs monitoring the U-PDCCH (block 760). The eNB may then send an assignment on the PDCCH for a SIB that instructs the UEs monitoring the PDCCH to switch to the U-PDCCH monitoring (block 765). The SIB assignment may be sent in the common search space of the PDCCH control region. The eNB may then send assignments to the UEs that were formerly monitoring the PDCCH on the U-PDCCH (block 770). In order to provide a measure of robustness, each UE may acknowledge that it has received the SIB, either with an explicit acknowledgement or a mechanism similar to the one described in FIG. 7a. During the ambiguity time, the assignments for UEs having not yet acknowledged their switch to U-PDCCH may be sent both on the PDCCH and the U-PDCCH, as an example.

It is noted that with the operations shown in FIG. 7b, the UEs monitoring the U-PDCCH may not be affected by the switch since the SIB assignment was sent in the common search space of the PDCCH region only, unless, of course, the same or similar SIB assignment was sent in the U-PDCCH control region. It is further noted also that some individual overrides are possible for UEs. In such a case, the eNB may send a message to a UE or a particular group of UEs to instruct it (or them) regarding which control channel region to monitor.

In the operations described in FIG. 7b, the SIB message may be broadcasted to all UEs monitoring the PDCCH control region, and, by default, the UEs are switched. It is of course possible to use a different broadcasting mechanism other than sending a SIB to instruct the UEs of the switch. It may also be possible to restrict the switching to a given group of UEs by, e.g., creating a multicast group, and sending the switching indication to the multicast group only. Alternatively, the SIB may comprise an indication to switch for only a subset of UEs. As an example, this could be done by instructing only UEs having their UE Radio Network Temporary Identifier (RNTI) ending up in a specified digit (or some other specified value) to switch.

For some carriers, such as an extension carrier without PDCCH, U-PDCCH may be the default, for example. The use of a control message on a SIB may be useful if switching occurs frequently. Robustness may be added by having the UE sending an acknowledgement of receipt of the control message.

Blind switching may be used by the UE to switch its monitoring of the PDCCH to the U-PDCCH and vice-versa. With blind switching, signaling from the eNB may not be required. In blind switching, the UE may monitor both the U-PDCCH and the PDCCH and can receive its assignment from either control channel. Blind switching may be used in conjunction with a reduction in search space to help reduce a number of blind decodings that the UE performs. For instance, the common search space may be restricted to the PDCCH control region only, and the U-PDCCH control region may have the same number of possible candidates as the dedicated PDCCH search space.

Implicit switching may also be used to cause the UE to switch its monitoring of the PDCCH to the U-PDCCH and vice-versa. As an example, implicit switching may be based on a power level monitored by the UE. The UE may also report the power level to the eNB. The UE may switch automatically when the power level meets a threshold, which may be provided to the UE during initial attachment or during operations. The threshold may also be sent by, e.g., higher layer signaling, or may be broadcasted.

Figure 8:
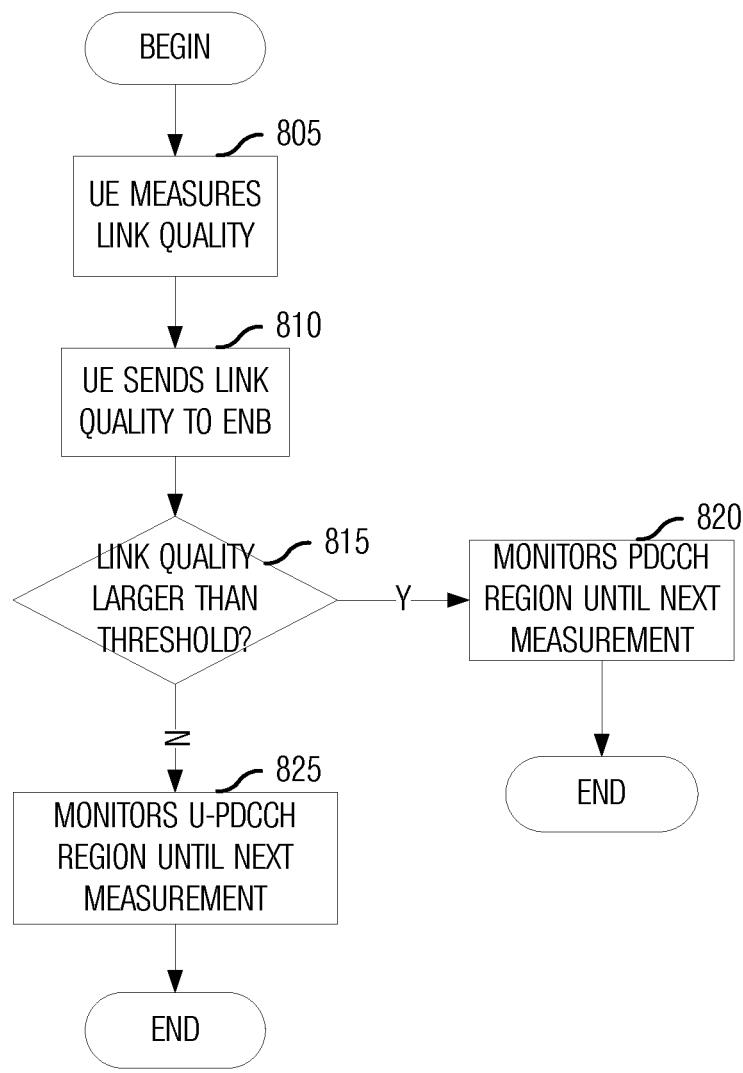
FIG. 8 illustrates an example flow diagram of UE operations in switching from monitoring a PDCCH control region to a U-PDCCH control region with implicit acknowledgement based on power measurements according to example embodiments described herein.

FIG. 8 illustrates a flow diagram of operations 800 in a UE as the UE participates in implicit switching. Operations 800 may be indicative of operations occurring in a UE, such as UE 110 and UE 120, as the UE participates in implicit switching according to a specified threshold.

Operations 800 may begin with the UE measuring the link quality (block 805). As an example, the UE may measure the link quality of a link between itself and an eNB that is serving the UE. As an alternative example, instead of the link quality, the UE may measure an error rate or a metric of the link, such as a data rate, a bit rate, and the like. The UE may send the measured link quality to the eNB (block 810). The UE may compare the measured link quality to a threshold, which may be sent directly to the UE or broadcast to the UE (block 815). If the link quality is above (or, alternatively, below) a threshold as indicated by 'Y', the UE may monitor the PDCCH region until it may be told to stop monitoring the PDCCH or until the UE measures the link quality and the newly measured link quality indicates to the UE to stop monitoring the PDCCH (block 820). If the link quality is below (or, alternatively, above) a threshold as indicated by 'N', the UE may monitors the U-PDCCH region until it may be told to stop monitoring the U-PDCCH or until the UE measures the link quality and the newly measured link quality indicates to the UE to stop monitoring the U-PDCCH (block 825). It is noted that the relationship between the measured link quality and the threshold and how the PDCCH or the U-PDCCH is selected may depend on the threshold. As an example, with a first threshold, if the measured link quality is above the first threshold then the UE may monitor the U-PDCCH. However, with a second threshold, if the measured link quality is above the second threshold then the UE may monitor the PDCCH.

Figure 9:
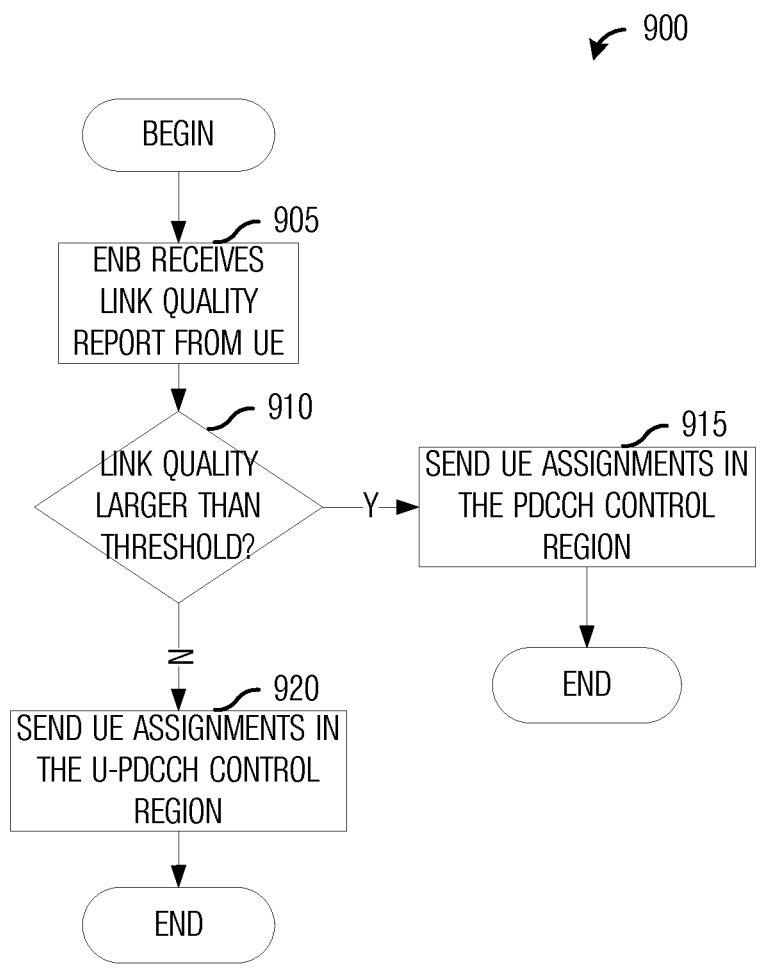
FIG. 9 illustrates an example flow diagram of eNB operations in switching a UE from monitoring a PDCCH control region to a U-PDCCH control region with implicit acknowledgement based on power measurements according to example embodiments described herein.

FIG. 9 illustrates a flow diagram of operations 900 in an eNB as the eNB participates in implicit switching. Operations 900 may be indicative of operations occurring in an eNB, such as eNB 105, as the eNB participates in implicit switching according to a specified threshold.

Operations 900 may begin with the eNB receiving a link quality report from the UE (block 905). The eNB may compare a link quality in the link quality report to a threshold (block 910). As discussed above, instead of the link quality report, the eNB may receive an error rate report or a metric report, such as a data rate, a bit rate, and the like. If the link quality is above (or, alternatively, below) a threshold as indicated by 'Y', the eNB may send assignments for that particular UE in the PDCCH region until the eNB decides to stop using the PDCCH or until the eNB receives another link quality report from the UE (block 915). If it is below (or, alternatively, above) the threshold as indicated by 'N', the eNB may send assignments for that particular UE in the U-PDCCH region until the eNB decides to stop using the PDCCH or until the eNB receives another link quality report from the UE (block 920). It is noted that the relationship between the measured link quality and the threshold and how the PDCCH or the U-PDCCH is selected may depend on the threshold. As an example, with a first threshold, if the measured link quality is above the first threshold then the UE may monitor the U-PDCCH. However, with a second threshold, if the measured link quality is above the second threshold then the UE may monitor the PDCCH.

Measured link quality may be any indicator of the quality of the communications link such as: signal-to-interference plus noise-ratio, signal to interference ratio, signal to noise ratio, received power level, received interference level, and the like. In addition, in order to make the process more robust, there might be an acknowledgement process when the switching occurs to make sure that the eNB and UE are sending and/or monitoring the right region. As an example, the measured link quality may be reported using the existing CQI/PMI/RI reporting mechanism.

Furthermore, instead on being valid until the next link quality report is sent (or received), the monitoring of a given control region (PDCCH (i.e., the first control region) or U-PDCCH (i.e., the second control region)) may be valid for a given time known a priori by both the UE and the eNB. After that time, the UE may fall back to monitoring a known (or default) control region, such as the PDCCH control region. Mechanisms to help prevent a ping pong effect wherein the power level is near the threshold and causes the UE to repeatedly switch its monitoring of the control channel may be used. As an example, mechanisms used to prevent the ping pong effect in handover situations may also be used in control channel switching.

Control channel assignments may also be made on a subframe-by-subframe basis. As an example, some subframes may be predefined or configured using higher layer signaling to convey which control channel the UE should be monitoring. The assignment may be made on a per UE basis or UE group basis. On a particular subframe, the UE knows which control channel to detect, either the PDCCH or the U-PDCCH, for example. As an example, the subframes of a frame or a plurality of subframes are divided by the eNB into a plurality of subsets. In one illustrative example, two subsets may be used: S1 and S2. On subset S1, the assignments are sent in the PDCCH control region only and on subset S2, the assignments are sent in the U-PDCCH control region. The UE monitors the control region according to the subset.

Figure 10:
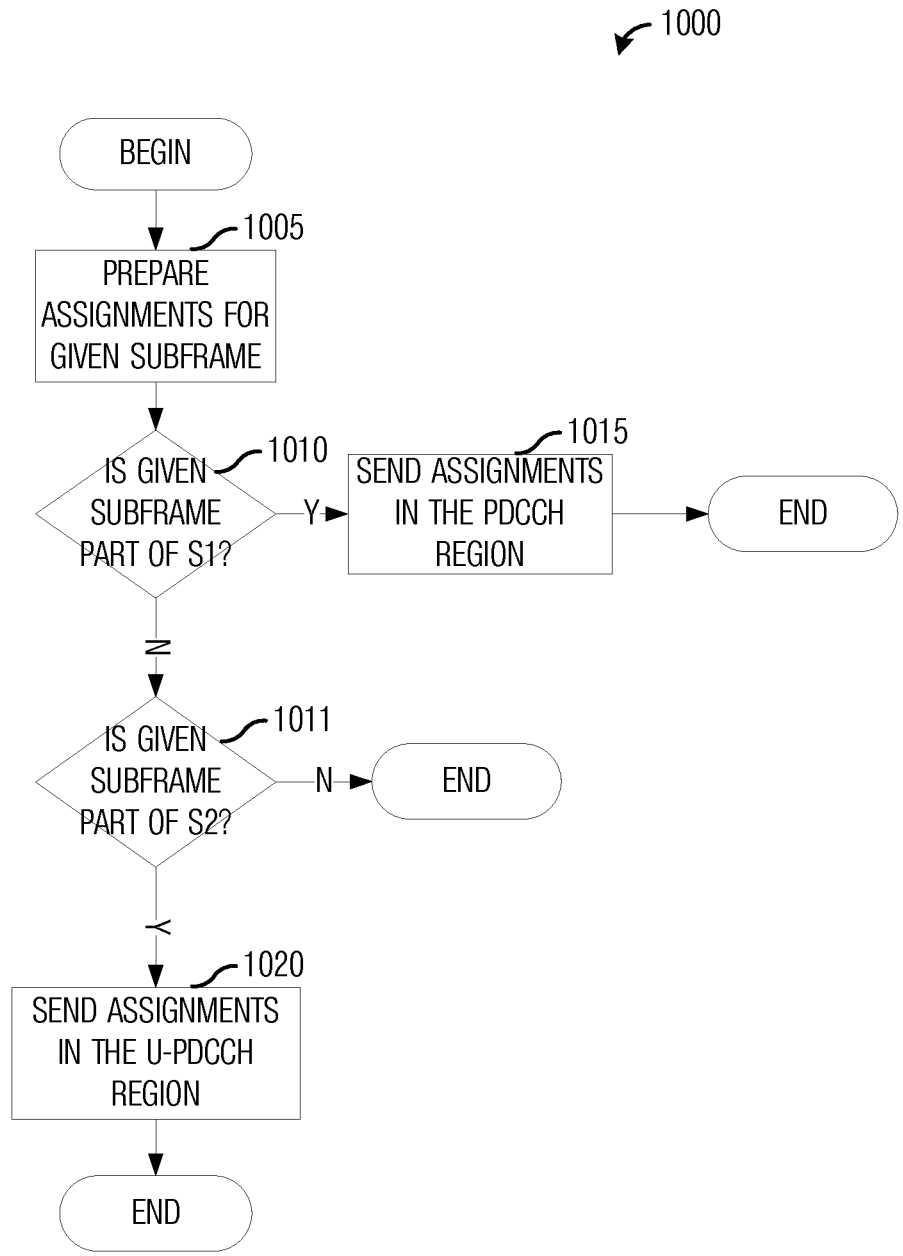
FIG. 10 illustrates an example flow diagram of eNB operations in switching a UE from monitoring a PDCCH control region to a U-PDCCH control region on a subframe by subframe basis according to example embodiments described herein.

FIG. 10 illustrates a flow diagram of operations 1000 in an eNB as it participates in subframe-by-subframe control channel assignments. Operations 1000 may be indicative of operations occurring in an eNB, such as eNB 105, as the eNB participates in subframe-by-subframe control channel assignments.

Operations 1000 may begin with the eNB determining assignments for the UEs scheduled for that particular subframe (block 1005). As an example, the assignments for the UEs may be generated by the eNB, computed by the eNB, extracted from a message or information received by the eNB, retrieved from a memory, specified by a technical standard, predetermined by an operator of the communications system, and the like. In blocks 1010 and 1011, the eNB may determine whether the subframe belongs to subset S1 or subset S2. If the subframe belongs to subset S1, the eNB may send the assignments in the PDCCH control region (block 1015). If the subframe belongs to subset S2, the eNB may send the assignments in the U-PDCCH control region (block 1020). It is noted that the above discussion of which subset corresponds to which control channel are merely illustrative examples and that other subset to control channel associations may be possible.

Figure 11:
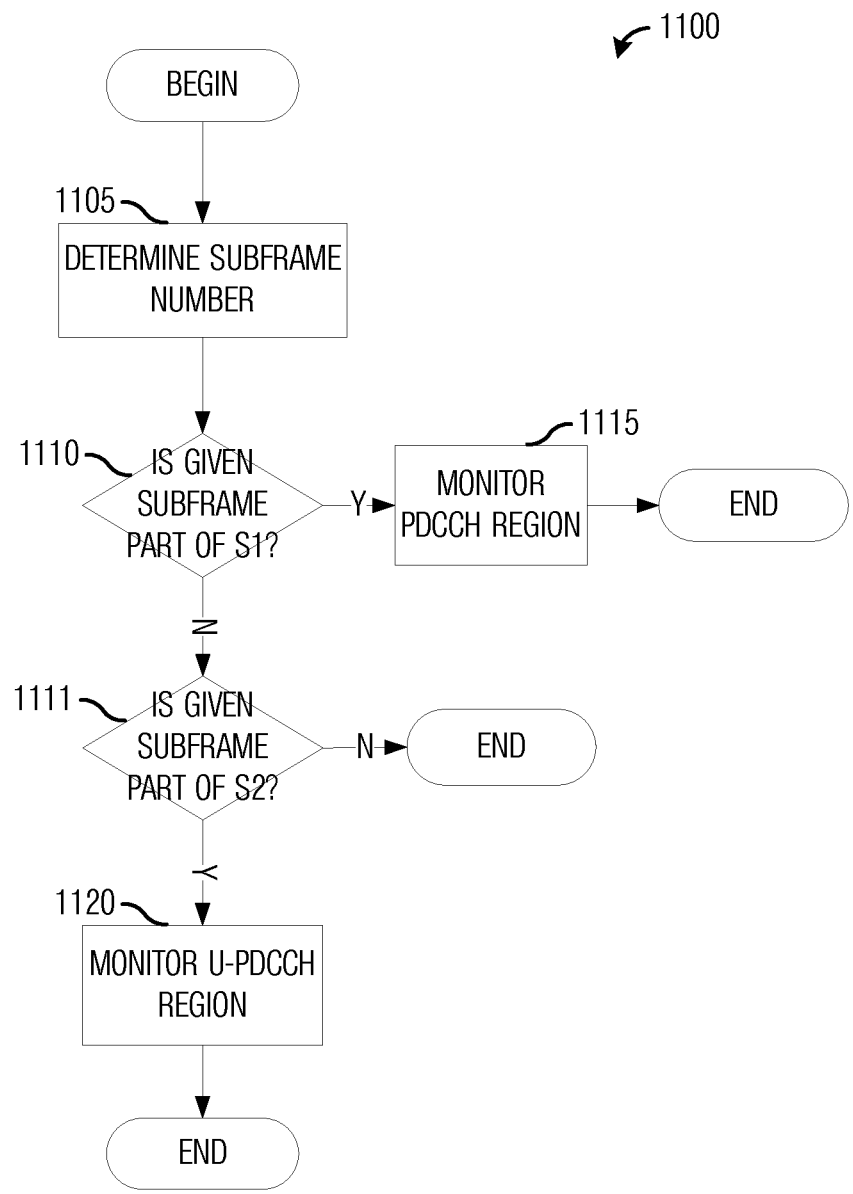
FIG. 11 illustrates an example flow diagram of UE operations in switching from monitoring a PDCCH control region to a U-PDCCH control region on a subframe by subframe basis according to example embodiments described herein.

FIG. 11 illustrates a flow diagram of operations 1100 in a UE as it participates in subframe-by-subframe control channel assignments. Operations 1100 may be indicative of operations occurring in a UE, such as UE 110 and UE 120, as the UE participates in subframe-by-subframe control channel assignments.

Operations 1100 may begin with the UE determining a number of the subframe (block 1105). As an example, the number of the subframe may be used to determine which subframe subset the subframe belongs. In blocks 1110 and 1111, the UE may determine whether the subframe belongs to subset S1 or subset S2. The UE may then monitor the control region based on the subset determination in blocks 1110 and 1111. As an example, if the subframe belongs to subset S1, the UE may monitor the PDCCH region (block 1115). While, if the subframe belongs to subset S2, the UE may monitor the U-PDCCH region (block 1120).

As another illustrative example, the subframes of a frame or a plurality of subframes may be divided into three subsets, S1, S2, and S3, where the PDCCH control region is used for the subframes belonging to subset S1, the U-PDCCH control region is used for the subframes belonging to subset S2, and for the subframes belonging to subset S3, the eNB may not transmit any resource assignments in those subframes, and the UE may not assume that it will get an assignment on such a subframe. In another illustrative example, the subframes of a frame may be divided into three subsets, S1, S2, and S3, where the PDCCH control region is used for the subframes belonging to subset S1, the U-PDCCH control region is used for the subframes belonging to subset S2, and for the subframes belonging to subset S3, both the U-PDCCH and PDCCH control regions are present. The presence of the subsets as well as their configuration may be signaled using RRC signaling, OAM signaling, may be broadcasted on e.g., a SIB, and the like. A specification of which subframes may be assigned which control channel may be based on information, such as ABS assignments. As an example, a specific UE may be assigned to monitor subframes pertaining to a single subset only, so it only has to monitor either the PDCCH or the U-PDCCH control region. Alternatively, a UE may be assigned to monitor subframes of more than one subset.

Control channel assignments may also be dynamically triggered. As an example, an indicator or a bit in a PDCCH (or in a U-PDCCH) may indicate that the UE should also look in the U-PDCCH (or in the PDCCH) control region. An indicator in a PDCCH may indicate to the UE that it should also search in the U-PDCCH control region. Similarly, an indicator in a U-PDCCH may indicate to the UE that it should also search in the PDCCH control region. Similarly, a multi-bit indicator may indicate that the UE should search in the PDCCH control region, the U-PDCCH control region, or both the PDCCH and the U-PDCCH control regions.

Figure 12:
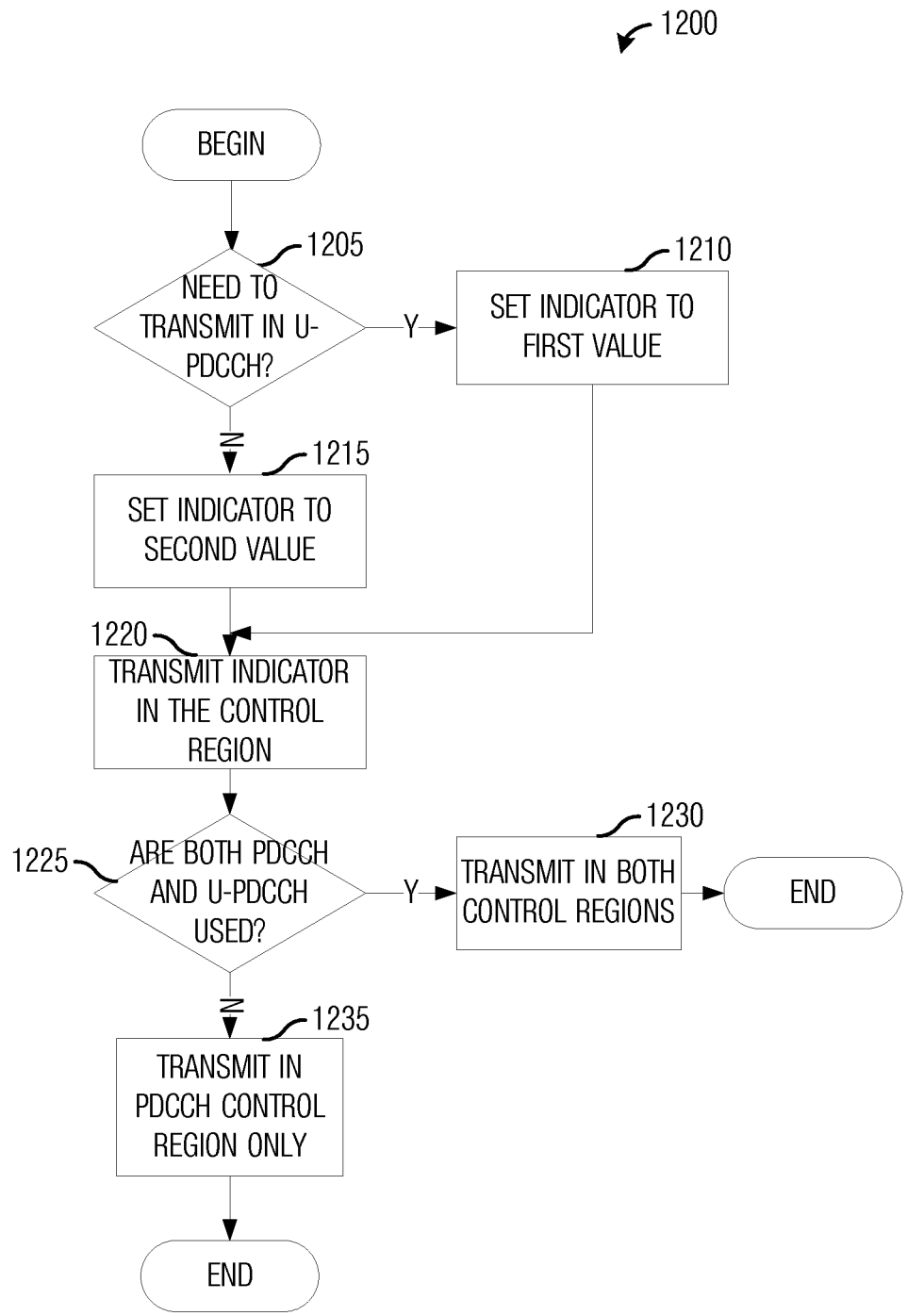
FIG. 12 illustrates an example flow diagram of eNB operations in switching a UE from monitoring a PDCCH control region to a U-PDCCH control region with a dynamic trigger according to example embodiments described herein.

FIG. 12 illustrates a flow diagram of operations 1200 in an eNB as the eNB uses dynamically triggered control channel assignments. Operations 1200 may be indicative of operations occurring in an eNB, such as eNB 105, as the eNB uses dynamically triggered control channel assignments.

Operations 1200 may begin with the eNB determining whether it will transmit in the U-PDCCH region (block 1205). If the eNB determines that it will transmit in the U-PDCCH region (for example 'Y'), the eNB may set an indicator to a first value, such as '1' (block 1210). Otherwise (for example 'N'), the eNB may set the indicator to a second value, such as '0' (block 1215). The eNB may then send the indicator in the common search space of the PDCCH region (block 1220). The eNB may determine whether the U-PDCCH and the PDCCH control regions are used (block 1225). If both regions are used (for example 'Y'), the eNB may then determine which assignments are to be sent on the PDCCH region and which assignments are to be sent on the U-PDCCH region, and sends them accordingly (block 1230). Otherwise (for example 'N'), the eNB may send the assignments in the PDCCH control region only (block 1235). It is noted that by extension, a multi-bit indicator may be used to enable the eNB to transmit in the PDCCH control region, the U-PDCCH control region, or both the PDCCH control region and the U-PDCCH control region.

Figure 13:
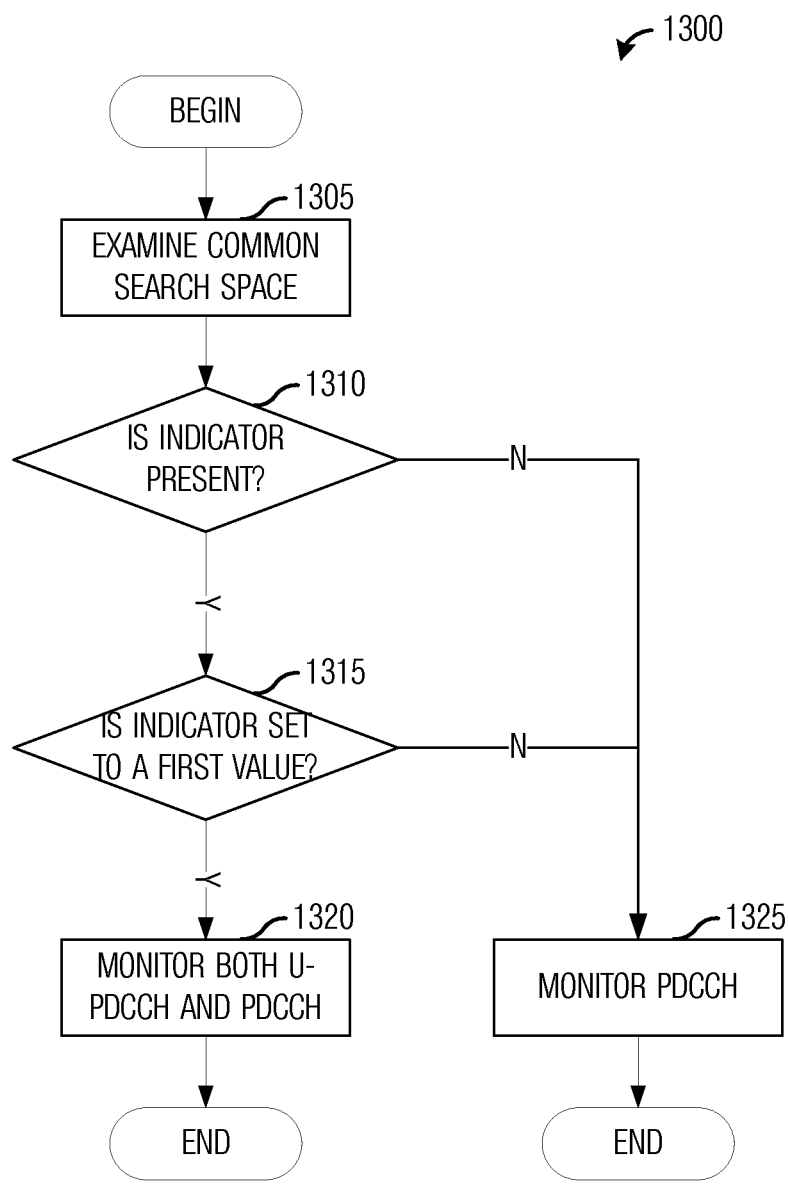
FIG. 13 illustrates an example flow diagram of UE operations in switching from monitoring a PDCCH control region to a U-PDCCH control region with a dynamic trigger according to example embodiments described herein.

FIG. 13 illustrates a flow diagram of operations 1300 in a UE as the UE participates in dynamically triggered control channel assignments. Operations 1300 may be indicative of operations occurring in a UE, such as UE 110 and UE 120, as the UE participates in dynamically triggered control channel assignments.

Operations 1300 may begin with the UE monitoring the common search space of the PDCCH control region (block 1305). The UE may perform a check to determine if the indicator is present (block 1310). If the indicator is present, the UE may examine the indicator to determine a value of the indicator. If the indicator is set to the first value (for instance '1' to indicate the presence of the U-PDCCH), the UE may monitor both the U-PDCCH and the PDCCH regions (block 1320). If the indicator is set to a second value (for instance '0' to indicate the absence of the U-PDCCH), the UE may monitor the PDCCH control region only (block 1325). If there is no indicator (block 1310), the UE may monitor the PDCCH control region (block 1325). It is noted that by extension, a multi-bit indicator may enable the UE to monitor the PDCCH control region, the U-PDCCH control region, or both the PDCCH control region and the U-PDCCH control region.

An eNB may determine when to transmit the U-PDCCH (or both the PDCCH and the U-PDCCH) on a frame-by-frame basis, for an extended period of time (such as a number of frames), and the like. The indicator may be sent in both the U-PDCCH and PDCCH common search space regions. The indicator may comprise one or more bits. Alternatively, the indicator may comprise one or more states of another control field, such as unused combinations of bits in an existing control field. Additionally, if an absence of the indicator may indicate that no U-PDCCHs are transmitted in the U-PDCCH control region, or that no assignment is transmitted in a particular subframe, then the indicator may not necessarily be sent in the common search space of the PDCCH region, but the indicator may consist of one bit that is transmitted on the PCFICH, for example.

In order to avoid requiring the UEs monitor both the PDCCH and U-PDCCH control regions, the indicator may be expanded to indicate monitoring assignments for a group of UEs. As an example, the indicator may indicate that assignments for a group of UEs are in the U-PDCCH control region. The expansion may be implemented, for example, by sending a group ID in the indicator, e.g., sending the last digit of the UE RNTI, for UEs that are to monitor the U-PDCCH control region. In addition, the indicator may be overridden by higher layer and/or dedicated signaling.

Furthermore, during a handover, information regarding which control channel and/or control region the UE should monitor at a handover target may be conveyed during a message exchanged during the handover process.

An example communications system design may be as follows:

Any eNB is capable of transmitting the PDCCH and/or the U-PDCCH. While previous release (e.g., Release-10 or earlier) UEs only monitor the PDCCH, new release (i.e., the releases supporting U-PDCCH, e.g. Release-11 UEs or later) UEs may monitor both channels. The ability of a UE to monitor U-PDCCH may be mandatory, may be mandatory but only tested if a feature group indicator (FGI) is set to indicate that it is tested, or a UE capability where the UE may or may not have the ability;

UE capable of monitoring the U-PDCCH may first look at the PDCCH common search space. Each UE may be assigned to monitor either the PDCCH and/or the U-PDCCH by RRC signaling;

UEs may monitor the U-PDCCH, but first decode the PDCCH common search space. In the PDCCH common search space region, there may be an indicator (e.g., one bit) to indicate whether the U-PDCCH is present or not. In the PDCCH common search space, there may also be a Downlink Control Information (DCI) format 3B message to indicate the U-PDCCH characteristics;

In addition, the UE may find a message to indicate a reconfiguration of the search space for the U-PDCCH. If no message is present, the UE may assume that the UE-specific search space is the same as before. If there is a message, the UE may immediately use the new configuration;

The U-PDCCH starts on the symbol immediately following the PDCCH; and

If the UE receives an indication to monitor the U-PDCCH, the UE may attempt blind decoding on its UE-specific U-PDCCH search space with the U-PDCCH characteristics. If the UE does not receive the indication, the UE may assume that it has no assignment, and does not need to perform additional blind decodes on the PDCCH region.

Figure 14:
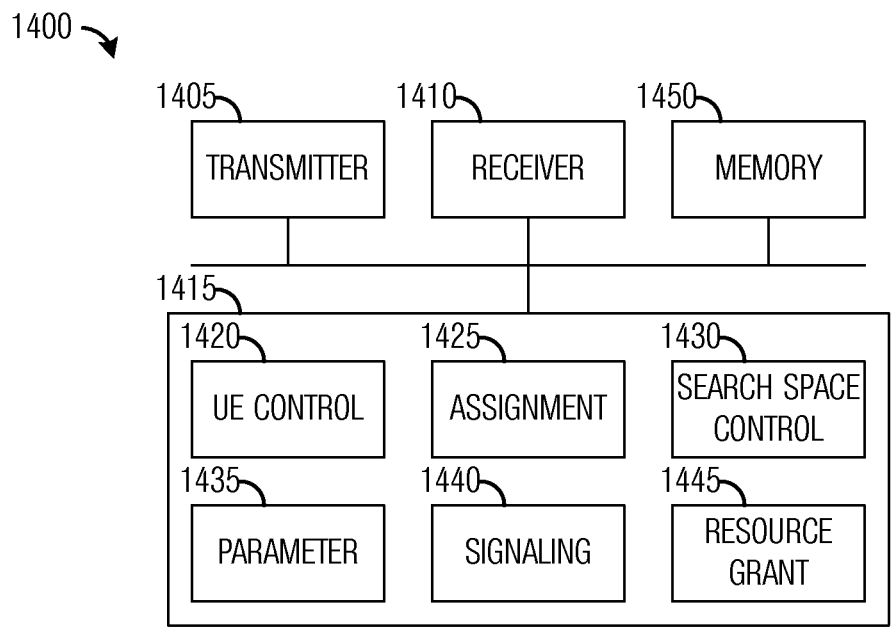
FIG. 14 illustrates an example communications device according to example embodiments described herein.

FIG. 14 illustrates a communications device 1400. Communications device 1400 may be used to implement various ones of the embodiments discussed herein. As shown in FIG. 14, a transmitter 1405 is configured to transmit information and a receiver 1410 is configured to receive information.

A UE controller 1420 is configured to determine which control channel(s) a UE is to monitor. The determination may be based on a number of factors, such as UE capability, communications system capability, and the like. An assignment unit 1425 is configured to assign a UE to monitor a control channel(s). Assignment unit 1425 may select a location for the control channel(s), as an example, assignment unit 1425 may select a control channel type for the control channel that the UE is assigned to monitor. For example, assignment unit 1425 may assign a UE to monitor a PDCCH, a U-PDCCH, or both PDCCH and U-PDCCH. A search space controller 1430 is configured to specify a search space or a set of search spaces (possibly out of a number of possible search spaces) where a UE may search to find a U-PDCCH. A parameter unit 1435 is configured to select and/or assign communications parameters, such as rank, coding rate, modulation scheme, antenna port, and the like, to a UE. A signaling unit 1440 is configured to generate messages and/or indications to be transmitted to a UE, where the messages and/or indications convey control information, channel assignments, parameters, and the like. Signaling unit 1440 is configured to modulate information to be transmitted, as well as map the modulated information onto resources, such as resource elements, resource blocks, control channel elements, and the like. A resource grant unit 1445 is configured to grant network resources to UEs. A memory 1450 is configured to store information, such as channel assignment, parameters, etc.

The elements of communications device 1400 may be implemented as specific hardware logic blocks. In an alternative, the elements of communications device 1400 may be implemented as software executing in a processing unit such as processor (e.g., microprocessor or digital signal processor), controller, application specific integrated circuit, and the like. In yet another alternative, the elements of communications device 1400 may be implemented as a combination of software and/or hardware.

As an example, transmitter 1405 and receiver 1420 may be implemented as a specific hardware block, while UE controller 1420, assignment unit 1425, search space controller 1430, parameter unit 1435, signaling unit 1440, and resource grant unit 1445 may be software modules executing in a microprocessor or a custom circuit or a custom compiled logic array of a field programmable logic array.

Figure 15:
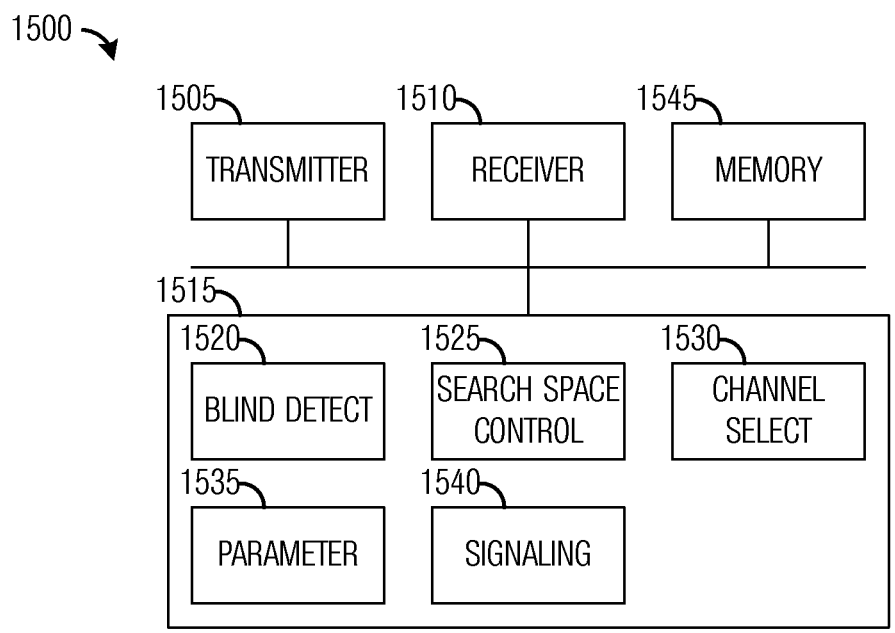
FIG. 15 illustrates an example communications device according to example embodiments described herein.

FIG. 15 illustrates a communications device 1500. Communications device 1500 may be used to implement various ones of the embodiments discussed herein. As shown in FIG. 15, a transmitter 1505 is configured to transmit information and a receiver 1510 is configured to receive information.

A blind detector 1520 is configured to detect transmissions by search a search space for the transmissions. A search space controller 1525 is configured to control the searches made by communications device 1500 based on search space(s) specified by an eNB controlling the communications device 1500. A channel selector 1530 is configured to select a control channel to monitor based on instructions from the eNB, power measurements, performance metrics, a location indicator, control channel type, and the like. A parameter unit 1535 is configured to process communications parameters provided by the eNB. Signaling unit 1540 is configured to demodulate information from resources, such as resource elements, resource blocks, control channel elements, and the like. A memory 1545 is configured to store information, such as channel assignment, parameters, etc.

The elements of communications device 1500 may be implemented as specific hardware logic blocks. In an alternative, the elements of communications device 1500 may be implemented as software executing in a processing unit such as processor (e.g., microprocessor or digital signal processor), controller, application specific integrated circuit, and the like. In yet another alternative, the elements of communications device 1500 may be implemented as a combination of software and/or hardware.

As an example, transmitter 1505 and receiver 1520 may be implemented as a specific hardware block, while blind detector 1520, search space controller 1525, channel selector 1530, parameter unit 1535, and signaling unit 1540 may be software modules executing in a microprocessor or a custom circuit or a custom compiled logic array of a field programmable logic array.

Figure 16:
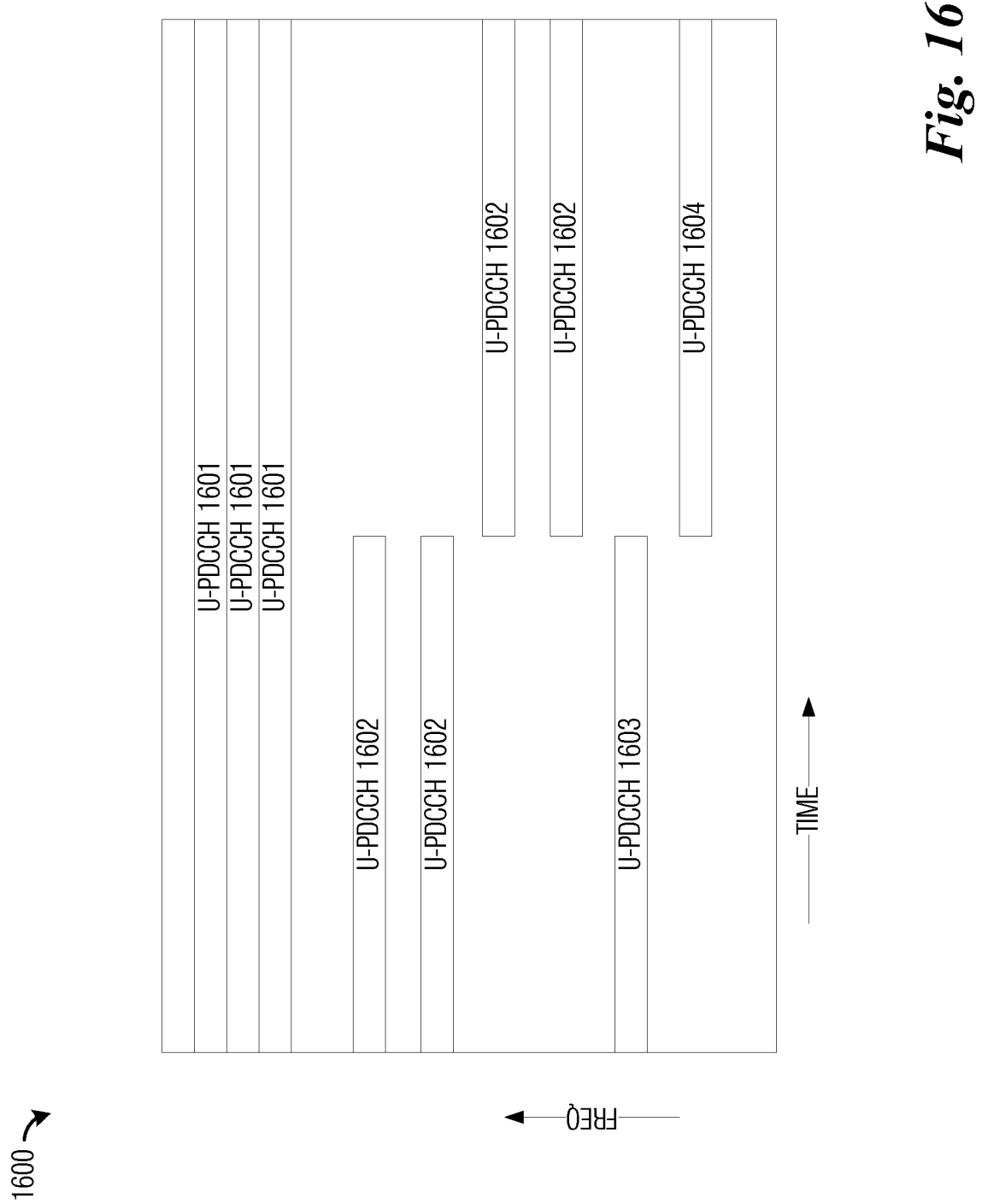
FIG. 16 illustrates locations of example U-PDCCHs within a new control region according to example embodiments described herein.

FIG. 16 illustrates locations of exemplary U-PDCCH within a new control region 1600. As shown in FIG. 16, a U-PDCCH 1601 may span a range of frequencies within a data region. While U-PDCCH 1602 may include RBs in a first slot and in a second slot. U-PDCCH 1603 may include RBs in the first slot and U-PDCCH 1604 may include RBs in the second slot.

A time location of the U-PDCCH may also be defined. For example, the R-PDCCH as defined for 3GPP LTE Release-10 always starts on the fourth symbol (symbol #3 using zero-based numbering). It may be desirable to have the U-PDCCH starting as early as symbol #0. This could occur, for an example, in a carrier designated as an extension carrier, which does not have a PDCCH region. In such as case, cross carrier scheduling or U-PDCCH would be used, with switching possible between the PDCCH performing the cross carrier scheduling and the U-PDCCH behaving as described in the previous section, if both the U-PDCCH and PDCCH control regions are present. Another possibility may be to use a Physical Control Format Indicator Channel (PCFICH) to obtain PDCCH length. As an example, an eNB may transmit both the PDCCH and the U-PDCCH, with the U-PDCCH starting after PDCCH if both occupy a single subframe or with the U-PDCCH starting as early as at symbol #0 if there is no PDCCH in the subframe.

Figure 17:
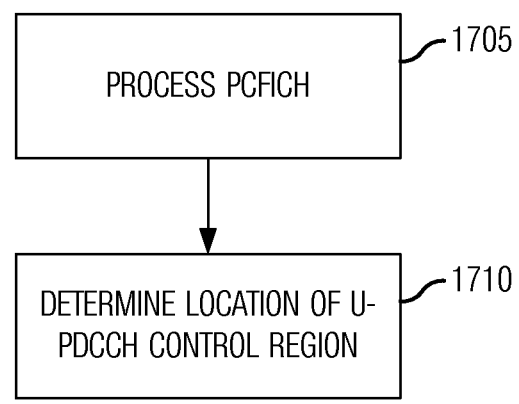
FIG. 17 illustrates an example flow diagram of UE operations in searching for U-PDCCH using a PCFICH according to example embodiments described herein.

FIG. 17 illustrates a flow diagram of UE operations 1700 in searching for U- for a U-PDCCH using a PCFICH. UE operations 1700 may be indicative of operations occurring in a UE, such as UE 110 and UE 120, as the UE uses a PCFICH to search for a U-PDCCH.

UE operations 1700 may begin with the UE determining a temporal duration (e.g., a Control Format Indicator (CFI) value) of the PDCCH control region from the PCFICH (block 1205). The UE may determine the starting point of the U-PDCCH control region based on the end of the PDCCH control region (block 1210). For instance, the U-PDCCH control region may start on the symbol immediately following the PDCCH control region, or one or more symbols later (e.g., after an offset). This offset can be explicitly stated in the standard or may be provided by higher layer signaling, e.g., RRC or SIB. However, if there is no PDCCH control region, the U-PDCCH control region may start on the symbol immediately following the start of the subframe.

Advantageous features of embodiments of the disclosure may include: a method for a wireless network node to send resource grants for a given subframe to a plurality of wireless nodes in a transmission system using multicarrier modulation, the method comprising: determining two control regions, wherein a first control region occupies one or time symbols at the beginning of the frame, and wherein a second control region occupies some of the resources in a remainder of the frame; transmitting resource allocation grants to wireless nodes in either of the control region; and sending to each wireless node an indication of which control region to monitor.

The method could further include, wherein the indication is sent by higher layer signaling. The method could further include, wherein the wireless network node receives an acknowledgment after having sent the indication of which control region to monitor. The method could further include, wherein the resource grants for a particular wireless node are sent on both control regions until an acknowledgement is received. The method could further include, wherein the acknowledgement is implicitly derived from a packet acknowledgment message from the remote wireless node.

The method could further include, wherein the indication to switch is sent on a system information block. The method could further include, wherein the indication to switch comprises an indication to switch for a subset of users. The method could further include, wherein the subset of users is indexed by their UE RNTI. The method could further include, wherein the indication to switch is implicitly derived from a link quality reported by the wireless users.

The method could further include, wherein the link quality report comprises at least one of the following: signal to interference plus noise ratio, signal to interference radio, received power level, received interference power level. The method could further include, wherein the indication to switch is dependent on a subframe index. The method could further include, wherein the indication to switch is sent on a subframe by subframe basis. The method could further include, wherein the indication to switch is sent in a common search space region of a PDCCH region.

The method could further include, wherein the indication to switch comprises an indication to switch for a subset of users. The method could further include, wherein the subset of users is indexed by their UE RNTI. The method could further include, wherein the resource grants for a particular wireless node are sent on both control regions for a specified time period. The method could further include, wherein a timer is used to measure a duration of the determining the two control regions.

Advantageous features of embodiments of the disclosure may include: a method for wireless node operations, the method comprising: monitoring a first control region and a second control region, wherein a first control region occupies one or time symbols at a beginning of a frame, and wherein a second control region occupies some of the resources in a remainder of the frame; receiving an indication of which control region to monitor; and monitoring the first control region or the second control region responsive to the indication.

The method could further include, wherein the indication is received in higher layer signaling. The method could further include, further comprising sending an acknowledgement after receiving the indication. The method could further include, wherein resource grants for the wireless node are sent on both control regions until an acknowledgement is received by a wireless network node sending the indication. The method could further include, wherein the acknowledgement is implicitly derived from a packet acknowledgement message received by the wireless network node.

The method could further include, wherein the indication is received in a system information block. The method could further include, wherein the indication comprises an indication intended for a subset of wireless nodes. The method could further include, wherein the subset of wireless nodes is indexed by their UE RNTI. The method could further include, wherein the indication is implicitly derived from a link quality report sent by the wireless node.

The method could further include, wherein the link quality comprises a signal to interference plus noise ratio, a signal to interference radio, a received power level, a received interference power level, or combinations thereof. The method could further include, wherein the indication is dependent on a subframe index. The method could further include, wherein the indication is received on a subframe by subframe basis. The method could further include, wherein the indication is received in a common search space region of a PDCCH region.

The method could further include, wherein the indication comprises an indication to switch for a subset of wireless nodes. The method could further include, wherein the subset of users is indexed by their UE RNTI.

Advantageous features of embodiments of the disclosure may include: a wireless network node comprising: a search space control unit configured to determine control regions, wherein a first control region occupies one or time symbols at the beginning of a frame, and wherein a second control region occupies some of the resources in a remainder of the frame; a resource grant unit coupled to the search space control unit, the resource grant unit configured to grant network resources to wireless nodes in either of the first control region or the second control region; and a transmitter coupled to the search space control unit, the transmitter configured to transmit an indication of either the first control region or the second control region to monitor.

Although the present disclosure and its advantages have been described in detail, it should be understood that various changes, substitutions and alterations can be made herein without departing from the spirit and scope of the disclosure as defined by the appended claims.

What is claimed is:

1. A method for transmitting a subframe comprising a data region and a control region to a wireless node, the method comprising:
   transmitting, by a communications controller to the wireless node via higher layer signaling, an indicator indicating to the wireless node whether a first control channel type located in the control region of the subframe or a second control channel type located in the data region of the subframe is used for transmission of at least one downlink control information (DCI) for the subframe, the data region and the control region being separate non-overlapping regions of the subframe;
   mapping, by the communications controller in response to the indicator indicating the second control channel type, the at least one DCI and a demodulation reference signal (DMRS) onto resources in the data region of the subframe; and
   transmitting, by the communications controller, the subframe to the wireless node.

2. The method of claim 1, further comprising determining the resources in the data region of the subframe for the at least one DCI according to availability of the resources.

3. The method of claim 1, further comprising transmitting the first indicator using radio resource control signaling.

4. The method of claim 1, wherein the resources in the data region of the subframe comprise resource elements.

5. The method of claim 1, wherein the resources in the data region of the subframe comprise resource blocks.

6. The method of claim 1, further comprising determining the resources in the data region of the subframe for the at least one DCI according to a link quality measurement.

7. The method of claim 1, further comprising determining the resources in the data region of the subframe for the at least one DCI according to a subframe index.

8. The method of claim 7, wherein there is a plurality of subframes, and the method further comprises:
   allocating a first subset of the plurality of subframes, wherein the subframes in the first subset include control channels located in control regions of the subframes in the first subset; and
   allocating a second subset of the plurality of subframes, wherein the subframes in the second subset include control channels located in data regions of the subframes in the second subset, and wherein the second subset includes the subframe.

9. The method of claim 1, further comprising determining the resources in the data region of the subframe for the at least one DCI according to a user equipment radio network temporary identifier of the wireless node.

10. A method for receiving a subframe comprising a data region and a control region, the method comprising:
receiving, by a wireless node from a communications controller via higher layer signaling, an indicator indicating to the wireless node whether a first control channel type located in the control region of the subframe or a second control channel type located in the data region of the subframe is used for transmission of at least one downlink control information (DCI) for the subframe, the data region and the control region being separate non-overlapping regions of the subframe;
receiving, by the wireless node, the subframe from the communications controller; and
retrieving, by the wireless node in response to the indicator indicating the second control channel type, the at least one DCI and a demodulation reference signal (DMRS) from resources in the data region of the subframe.

11. The method of claim 10, further comprising receiving the indicator using radio resource control signaling.

12. The method of claim 10, further comprising retrieving the DMRS from a physical downlink control channel (PDCCH) located in the data region of the subframe.

13. The method of claim 10, wherein retrieving the at least one DCI comprises demodulating the at least one DCI.

14. A communications controller comprising:
a non-transitory memory storage comprising instructions; and
a processor in communication with the non-transitory memory storage, wherein the processor executes the instructions to:
map, in response to an indicator indicating a second control channel type, at least one downlink control information (DCI) and a demodulation reference signal (DMRS) onto resources in a data region of a subframe; and
a transmitter operatively coupled to the processor, the transmitter configured to:
transmit, to a wireless node via higher layer signaling, the indicator indicating to the wireless node whether a first control channel type located in a control region of the subframe or the second control channel type located in the data region of the subframe is used for transmission of the at least one DCI for the subframe, wherein the data region and the control region of the subframe are separate non-overlapping regions of the subframe; and
transmit the subframe to the wireless node.

15. The communications controller of claim 14, wherein the transmitter is configured to transmit the indicator using radio resource control signaling.

16. The communications controller of claim 14, wherein the processor executes the instructions to determine the resources in the data region of the subframe for the at least one DCI according to a link quality measurement.

17. The communications controller of claim 14, wherein the processor executes the instructions to determine the resources in the data region of the subframe for the at least one DCI according to a subframe index.

18. The communications controller of claim 14, wherein the processor executes the instructions to determine the resources in the data region of the subframe for the at least one DCI according to a user equipment radio network temporary identifier of the wireless node.

19. A wireless node comprising:
a receiver configured to:
receive, from a communications controller via higher layer signaling, an indicator indicating to the wireless node whether a first control channel type located in a control region of a subframe or a second control channel type located in a data region of the subframe is used for transmission of at least one downlink control information (DCI) for the subframe, the data region and the control region being separate non-overlapping regions of the subframe; and
receive the subframe from the communications controller;
a non-transitory memory storage comprising instructions; and
a processor in communication with receiver and the non-transitory memory storage, wherein the processor executes the instructions to:
retrieve, in response to the indicator indicating the second control channel type, the at least one DCI and a demodulation reference signal (DMRS) from resources in the data region of the subframe.

20. The wireless node of claim 19, wherein the receiver is configured to receive the indicator using radio resource control signaling.

21. The wireless node of claim 19, wherein the processor executes the instructions to retrieve the DMRS from a physical downlink control channel (PDCCH) located in the data region of the subframe.

22. The wireless node of claim 19, wherein the processor executing the instructions to retrieve the at least one DCI comprises the processor executing the instructions to demodulate the at least one DCI.

23. The wireless node of claim 19, wherein the processor executes the instructions to:
monitor, in response to the indicator, a wireless-node specific search space in the data region of the subframe for a second physical downlink control channel (PDCCH); and
monitor a common search space located in the control region of the subframe for a first PDCCH.

24. The method of claim 10, further comprising:
monitoring, in response to the indicator, a wireless-node specific search space in the data region of the subframe for a second physical downlink control channel (PDCCH); and
monitoring a common search space located in the control region of the subframe for a first PDCCH.

25. The communications controller of claim 14, wherein the processor executes the instructions to determine the resources in the data region of the subframe for the at least one DCI according to availability of the resources.

26. The communications controller of claim 14, wherein the resources in the data region of the subframe comprise resource elements.

27. The communications controller of claim 14, wherein the resources in the data region of the subframe comprise resource blocks.

28. The communications controller of claim 17, wherein there is a plurality of subframes, and wherein the processor executes the instructions to:
allocate a first subset of the plurality of subframes, wherein the subframes in the first subset include control channels located in control regions of the subframes in the first subset; and
allocate a second subset of the plurality of subframes, wherein the subframes in the second subset include control channels located in data regions of the subframes in the second subset, and wherein the second subset includes the subframe.

\* \* \* \* \*